US008127413B2

(12) United States Patent
Pu et al.

(10) Patent No.: US 8,127,413 B2
(45) Date of Patent: Mar. 6, 2012

(54) SYSTEM AND METHOD FOR PREVENTING RACE CONDITION VULNERABILITY

(75) Inventors: Calton Pu, Atlanta, GA (US); Jinpeng Wei, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1283 days.

(21) Appl. No.: 11/484,976

(22) Filed: Jul. 11, 2006

(65) Prior Publication Data
US 2008/0016410 A1 Jan. 17, 2008

(51) Int. Cl.
*G06F 21/00* (2006.01)
(52) U.S. Cl. .................. 26/25; 726/22; 726/23; 726/24; 726/26
(58) Field of Classification Search ............... 726/22–26
See application file for complete search history.

(56) References Cited

U.S. PATENT DOCUMENTS

| | | | | |
|---|---|---|---|---|
| 5,832,484 A * | 11/1998 | Sankaran et al. ............... 1/1 |
| 6,041,418 A * | 3/2000 | Chen et al. ................. 713/400 |
| 6,289,382 B1 * | 9/2001 | Bowman-Amuah ........ 709/226 |
| 6,334,190 B1 * | 12/2001 | Silverbrook et al. ........ 713/500 |
| 6,636,901 B2 * | 10/2003 | Sudhakaran et al. ........ 719/327 |
| 7,007,301 B2 * | 2/2006 | Crosbie et al. .............. 726/23 |
| 7,134,141 B2 * | 11/2006 | Crosbie et al. .............. 726/23 |
| 7,209,918 B2 * | 4/2007 | Li ..................................... 1/1 |
| 7,284,274 B1 * | 10/2007 | Walls et al. .................. 726/25 |
| 7,366,956 B2 * | 4/2008 | Karp et al. ................ 714/38.14 |
| 7,398,516 B2 * | 7/2008 | Berg et al. ................... 717/126 |
| 7,490,268 B2 * | 2/2009 | Keromytis et al. ....... 714/38.11 |
| 7,716,192 B2 * | 5/2010 | Petrank et al. .............. 707/695 |
| 7,971,255 B1 * | 6/2011 | Kc et al. ........................ 726/24 |
| 2003/0056149 A1 * | 3/2003 | Hue ............................... 714/38 |
| 2003/0140253 A1 * | 7/2003 | Crosbie et al. .............. 713/201 |
| 2007/0107058 A1 * | 5/2007 | Schuba et al. ............... 726/23 |
| 2010/0023810 A1 * | 1/2010 | Stolfo et al. .................. 714/38 |

OTHER PUBLICATIONS

RPS: An Extension of Reference Monitor to Prevent Race-Attacks; Jongwoon Park, Gunhee Lee, Sangha Lee, and Dong-kyoo Kim; PCM 2004, LNCS 3331, pp. 556-563, 2004.*
Haldar, S. and Subramanian, D. K. 1991. Fairness in processor scheduling in time sharing systems. SIGOPS Oper. Syst. Rev. 25, 1 (Jan. 1991), 4-18.*
Eugene Tsyrklevich, Bennet Yee; Dynamic Detection and Prevention of Race Conditions in File Accesses; Department of Computer Science and Engineering; University of California, San Diego; Security '03 Paper; USENIX; 12th USENIX Security Sypmosium.*

* cited by examiner

*Primary Examiner* — Edan Orgad
*Assistant Examiner* — James Turchen
(74) *Attorney, Agent, or Firm* — Wang Law Firm, Inc.; Li K. Wang

(57) ABSTRACT

A method for identifying vulnerable system call pairs is disclosed. The method is based on a model for identifying Time-Of-Check-To-Time-Of-Use (TOCTTOU) problem (called STEM), which enumerates the potential file system call pairs (called exploitable TOCTTOU pairs) that form the check/use steps. The system function calls are classified into a plurality of predefined classes and pairs of the function calls are formed according to predefined criteria, where the function calls within a pair are associated with the same file invariant.

27 Claims, 10 Drawing Sheets

| | |
|---|---|
| | Input: dentry $d$<br>Output: 0 – succeed, -1 – the binding of $d$ is tainted. |
| 1 | if $d$.refcnt = 0 |
| 2 | then $d$.fsuid current user ID, record current pid and current time in $d$.gh_list, $d$.refcnt++, $d$.tainted false, return 0.<br>else |
| 3 |   if $d$.fsuid = current user id |
| 4 |   then record current pid and current time in $d$.gh_list, if $d$.tainted = false |
| 5 |       then return 0 |
| 6 |       else return -1.<br>  else |
| 7 |     if current user ID = root |
| 8 |     then remove all invariants on $d$.gh_list, $d$.fsuid root, record current pid and current time in $d$.gh_list, $d$.refcnt 1, $d$.tainted false, return 0.<br>    else |
| 9 |       if $d$.fsuid = root |
| 10 |       then return 0.<br>      else |
| 11 |         if current user ID is the owner of $d$ |
| 12 |         then remove all invariants on $d$.gh_list, $d$.fsuid current user ID, record current pid and current time in $d$.gh_list, $d$.refcnt1, $d$.tainted false, return 0. |
| 13 |            else return 0. |

FIG. 9

SYSTEM AND METHOD FOR PREVENTING RACE CONDITION VULNERABILITY

BACKGROUND OF THE INVENTION

1. Field of the Invention

The present invention generally relates to security computer system, and more specifically, relates to a system and method for preserving data integrity in a computer system.

2. Description of the Related Art

TOCTTOU (Time-Of-Check-To-Time-Of-Use) is a well known security problem. An illustrative example is a Unix command, sendmail, which used to check for a specific attribute of a mailbox file (e.g., it is not a symbolic link) before appending new messages. However, the checking and appending operations do not form an atomic unit. Consequently, if an attacker (the mailbox owner) is able to replace his mailbox file with a symbolic link to /etc/passwd between the checking and appending steps by sendmail, then he may trick sendmail into appending emails to /etc/passwd. As a result, an attack message consisting of a syntactically correct /etc/passwd entry with root access would give the attacker root access. TOCTTOU is a serious threat: In 11 of the reported cases on TOCTTOU vulnerabilities between 2000 and 2004, the attacker was able to gain unauthorized root access. These cases cover a wide range of applications from system management tools (e.g., /bin/sh, shar, tripwire) to user level applications (e.g., gpm, Netscape™ browser). The TOCTTOU vulnerabilities affect many operating systems, including: Conectiva™, Debian™, FreeBSD™, HP-UX™, Immunix™, MandrakeSoft™, RedHat™, Sun Solaris™, and SuSE™. TOCTTOU vulnerabilities are widespread and cause serious consequences.

The sendmail example shows the structural complexity of a TOCTTOU attack, which requires (unintended) shared access to a file by the attacker and the victim (the sendmail), plus the two distinct steps (check and use) in the victim. This complexity plus the non-deterministic nature of TOCTTOU attacks make the detection difficult. For example, TOCTTOU attacks usually result in escalation of privileges, but no immediately recognizable damage. Furthermore, successful techniques for typical race condition detection such as static analysis are not directly applicable, since the attacker program is not available beforehand. Finally, TOCTTOU attacks are inherently non-deterministic and not easily reproducible, making post mortem analysis also difficult. These difficulties are illustrated by the TOCTTOU vulnerabilities recently found in vi and emacs commands, which appear to have been in place since the time those venerable programs were created.

Therefore, it is desirous to have an apparatus and method that prevent race condition vulnerabilities, and it is to such apparatus and method the present invention is primarily directed.

SUMMARY OF THE INVENTION

Briefly described, a system and method of the invention reduce the vulnerability caused by race conditions in a computer system. In one embodiment there is provided a method for reducing vulnerability in a computer system by identifying vulnerable pairs of function calls. The method includes classifying the function calls into a plurality of predefined classes, and generating a plurality of pairs of the function calls according to a predefined criteria, wherein each pair of the function calls being associated with a file invariant.

In another embodiment there is provided a system for reducing vulnerability in a computer system by identifying vulnerable pairs of function calls. The system includes a classifying unit for classifying the function calls into a plurality of predefined classes, and a generation unit for generating a plurality of pairs of the function calls according to a predefined criteria, wherein each pair of the function calls being associated with a file invariant.

In yet another embodiment, there is provided an operating system with reduced vulnerability. The operating system includes a library of plurality of function calls, a classifying unit for classifying the function calls into a plurality of predefined classes, and a generation unit for generating a plurality of pairs of the function calls according to a predefined criteria, wherein each pair of the function calls being associated with a file invariant.

The present system and methods are therefore advantageous as they prevent race condition vulnerabilities. Other advantages and features of the present invention will become apparent after review of the hereinafter set forth Brief Description of the Drawings, Detailed Description of the Invention, and the Claims.

BRIEF DESCRIPTION OF THE DRAWINGS

FIG. 9 illustrates an invariant holder tracking algorithm.

DETAILED DESCRIPTION OF THE INVENTION

Figure 1:
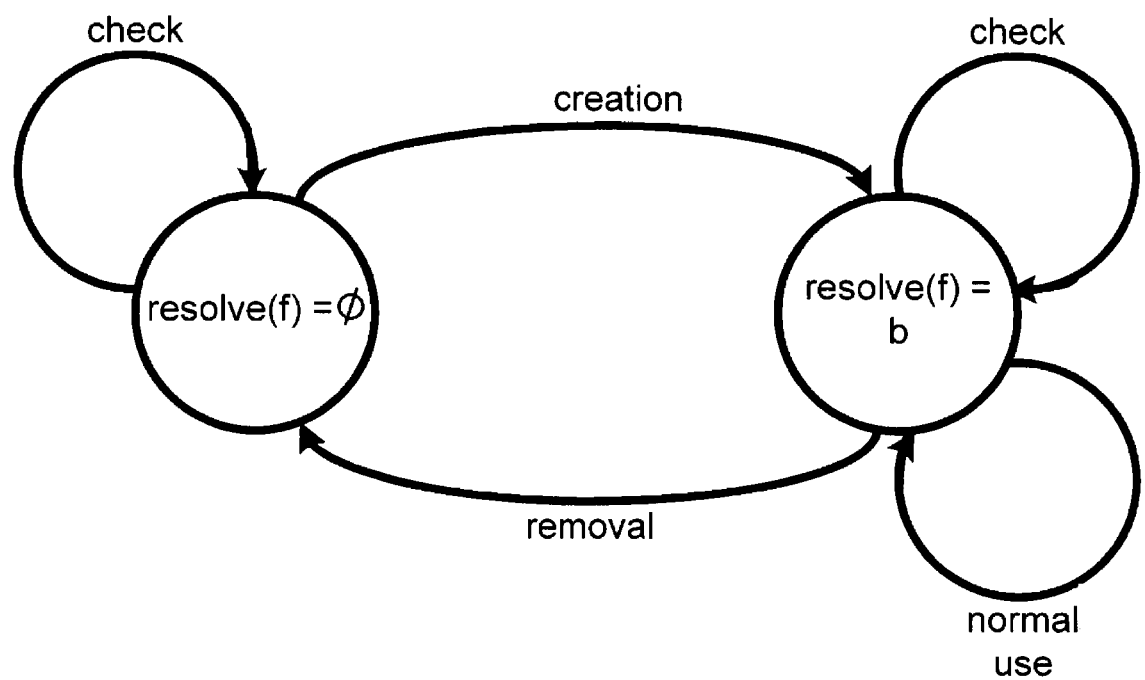
FIG. 1 depicts a state transition diagram for FS object f.

In this description, the term "application" as used herein is intended to encompass executable and nonexecutable software files, raw data, aggregated data, patches, and other code segments. The term "exemplary" is meant only as an example, and does not indicate any preference for the embodiment or elements described. Further, like numerals refer to like elements throughout the several views, and the articles "a" and "the" includes plural references, unless otherwise specified in the description.

In overview, the present system and method enables an operating system to detect and prevent TOCTTOU problems. First, a model is presented and then the system and method are developed based on this model. The model (called STEM—Stateful TOCTTOU Enumeration Model) captures potential vulnerabilities caused by TOCTTOU problems. The model is based on two mutually exclusive invariants: a file object either does not exist, or it exists and is mapped to a logical disk block. For each file object, one of these invariants must remain true between the check and use steps of every program. Otherwise, potential TOCTTOU vulnerabilities arise. This model allows enumeration of the file system call pairs of check and use (called exploitable TOCTTOU pairs), between which the invariants may be violated. From this model it is derived a protection mechanism, which maintains the invariants across all the exploitable TOCTTOU pairs by preventing access from other concurrent processes/users.

After classifying the file system calls, a systematic analysis for potential TOCTTOU vulnerabilities can be performed. These analyses provide a quantitatively better understanding of TOCTTOU attacks. An event-driven defense mechanism (called EDGI) based on the STEM model can then be used for preventing exploitation of TOCTTOU vulnerabilities. The EDGI defense has several advantages over previously proposed solutions. First, based on the STEM model, EDGI is a systematically developed defense mechanism with careful design (using event-condition-action ECA rules) and implementation and can stop TOCTTOU attacks. Second, with careful handling of issues such as inference of invariant scopes and time-outs, EDGI allows very few false positives. Third, it does not require changes to applications or file system application program interface (API). Fourth, the implementation on Linux kernel and its experimental evaluation show that EDGI carries little additional overhead.

The Abstract File System

Due to the complexity of the TOCTTOU problem in real file systems, a simplified Abstract File System (AbsFS) is developed and on which the TOCTTOU problem and design a defense mechanism is defined. The Abstract File System (AbsFS) manages a set of file system (FS) objects. Each file system object consists of a pathname, an ordered set of logical disk blocks, and a mapping of the pathname to the corresponding set of logical disk blocks. For simplicity it is assumed the AbsFS to contain only contiguous files, i.e., the set of logical disk blocks is sequential for every file, and the AbsFS only needs to map the pathname to the address (block number) of the initial logical disk block. Let F denote the set of all pathnames and B denote the set of all logical disk blocks, the pathname mapping function resolve is defined by:

resolve: $F \rightarrow B \cup \{\emptyset\}, \emptyset \subset B$

Given a pathname $f \rightarrow F$, if the AbsFS object corresponding to f exists, with the initial logical disk block number $b \rightarrow B$, then resolve(f)=b is defined. If the AbsFS object corresponding to f does not exist, then resolve(f)=$\emptyset$, is defined. The AbsFS defines an Application Programming Interface consisting of four operations on file objects:

Definition 1: creation(pathname) is the operation that creates new FS objects in the AbsFS by changing the mapping for pathname f from resolve(f)=$\emptyset$ to resolve(f)=b, for some $b \in B$.

Definition 2: removal(pathname) is the operation that changes the mapping for pathname f from resolve(f)=b to resolve(f)=$\emptyset$.

Definition 3: normal use(pathname) is the operation that works on an existing file system object and does not remove it.

Definition 4: check(pathname) is the operation that returns a predicate about the named FS object. The predicate may be resolve(f)=b or resolve(f)=$\emptyset$. The file f has to be in one of these two states.

An application uses the creation operation to create a new FS object, the check operation to determine the invariant resolve(f)=b or resolve(f)=$\emptyset$, the normal use operation to read or write the FS object, and the removal operation to delete an FS object. These four kinds of operations (creation, normal use, removal, and check) are all the currently defined AbsFS operations. The creation and removal operations change the resolve mapping, while the check and normal use operations do not change the resolve mapping. The AbsFS operations and FS object states can be represented in a state transition diagram shown in FIG. 1.

Since the TOCTTOU vulnerability happens with concurrent access by a victim process and an attacker process, the notation above is extended to include explicit modeling of concurrent file system object access.

Definition 5: Safe sequence of AbsFS operations. Given a sequence O of AbsFS operations invoked by a process/user on FS object f, $O(f)=o_1(f),o_2(f), \ldots, o_n(f)$, n>1, if $\forall, 1 \leq i \leq n-1$, resolve(f) remains an invariant between $o_i(f)$ and $o_{i+1}(f)$, it is said the sequence O(f) is a safe sequence of AbsFS operations (from the concurrency point of view). Since in most cases all the operations in the sequence belong to the same process/user, for notational simplicity, the process/user ID from the sequence is omitted. In case of interleaved operations, a superscript will be added to denote the different processes/users.

It is straightforward to see that the exclusive access by a single process to files is safe, i.e., the state of each FS object persists from the end of each AbsFS operation to the beginning of the next AbsFS operation under exclusive access.

Definition 6: Unsafe sequence of AbsFS operations: Given a sequence of operations $O(f)=o_1(f),o_2(f), \ldots, o_n(f)$, n>1, if $\exists i, 1 \leq i \leq n-1$, resolve(f) is not invariant between $o_i(f)$ and $o_{i+1}(f)$, i.e., $\text{resolve}_{o_i}(f) \neq \text{resolve}_{o_{i+1}}(f)$, O(f) is an unsafe sequence of AbsFS operations.

STEM Model of TOCTTOU

The TOCTTOU vulnerability is not due to a naively careless programming style. Consider the sendmail example. Hypothetically, the sendmail could simply open the file name that is the user's mailbox by naming convention (e.g., /usr/mail/username) and then append emails to that file. This simplistic approach fails immediately because the naming convention may or may not hold for all names (e.g., a user may have created a symbolic link from /usr/mail/username to /etc/passwd). To avoid this kind of problems, many system programmers have adopted a more careful programming style. In case of files, this careful programming style establishes a predicate on the file before using it. For example, sendmail establishes the predicate resolve(f)=b, where b belongs to a regular file, not a symbolic link, before appending messages to f. The predicate resolve(f)=b is an invariant that should remain true as long as the sendmail keeps appending messages. The predicate is an invariant instead of pre-condition, because the normal connotation of pre-condition is that it must be true before entering a function, but it may become false after the function has started. In contrast, the invariant must remain true through the duration of file usage.

All system utilities of interest will establish an invariant on a pathname before using it. This is represented in the notation by dividing a sequence of AbsFS operations $O(f)=o_1(f), \ldots, o_i(f), o_{i+1}(f), \ldots, o_n(f)$ into two subsequences. The first subsequence $o_1(f), \ldots, o_i(f)$ is called the "Check" part, and the second subsequence $o_{i+1}(f), \ldots, o_n(f)$ is called the "Use" part. The "Check" part establishes the invariant $\text{resolve}_{o_i}(f)$ and the "Use" part of the sequence relies on the invariant remaining true, i.e., O(f) is a safe sequence of AbsFS operations.

TOCTTOU Attacks in AbsFS

Definition 7: A TOCTTOU (Time-Of-Check-To-Time-Of-Use) attack on file object f consists of two concurrent processes, victim v and attacker a, with interleaved AbsFS operations that make v's sequence unsafe. Consider the victim v executing the sequence $O^v(f)=o_1^v(f), \ldots, o_i^v(f), o_{i+1}^v(f), \ldots, o_n^v(f)$, divided into the "Check" and "Use" parts. Concurrent with v, attacker a is able to change the mapping $resolve_{o_i}(f)$ established by v during the execution of the sequence $O^v(f)$, transforming it into an unsafe sequence. This is achieved by inserting the sequence $O^a(f)=O_1^a(f), o_2^a(f), \ldots, o_k^a(f)$ between the "Check" and "Use" parts of $O^v(f)$. The result becomes: $o_1^v(f), \ldots, o_i^v(f), o_1^a(f), o_2^a(f), \ldots, o_k^a(f), o_{i+1}^v(f) \ldots, o_n^v(f)$.

To illustrate the definition with concrete scenario, a Unix-style file system environment is used. Suppose the invariant established by v is $resolve_{o_i}(f)=b$, the attack sequence $O^a(f)$ of a can be: first remove f and then create a symbolic link named f which points to another file object t ($resolve(t)=b', b \neq b'$), resulting in $resolve_{o_k}^a(f)=b'$. If the invariant established by v is $resolve_{o_i}(f)=\emptyset$, a possible attack sequence $O^a(f)$ is to create the file object f, making $resolve_{o_k}^a(f) \neq \emptyset$.

The TOCTTOU attack is successful if $resolve_{o_i}^v(f) \neq resolve_{o_k}^a(f)$ and victim v continues execution without realizing the invariant created by the subsequence $o_1^v(f), \ldots, o_i^v(f)$ (the "Check" part) has been violated. Consequently, the subsequence $o_{i+1}^v(f) \ldots, o_n^v(f)$ (the "Use" part) will execute under the assumption of the original invariant, which is no longer true.

The side effect of v executing the "Use" subsequence $o_{i+1}^v(f) \ldots, o_n^v(f)$ after a successful TOCTTOU attack is that v is actually working on some other unintended file object. For example, if t=/etc/passwd in the sendmail example, emails may be appended to /etc/passwd.

Proposition 1: Violation of an invariant is a necessary condition for a successful TOCTTOU attack.

The proposition 1 follows from Definition 7. If there is no violation of invariants, the sequence $O^v(f)$ is a safe sequence, so there would be no TOCTTOU attack. Consequently, through the entire duration of $O^v(f)$, TOCTTOU attacks can be prevented by preserving the invariant established by $O^v(f)$ and making the sequence a safe sequence.

An Enumeration of TOCTTOU Pairs

Definition 8: Consider an unsafe sequence of AbsFS operations $O(f)=o_1(f), o_2(f), \ldots, o_n(f)$, where $resolve_{o_i}(f) \neq resolve_{o_{i+1}}(f)$. The two operations surrounding the violation of the original invariant (the last operation of the "Check" part and the first operation of the "Use" part), $o_i(f)$ and $o_{i+1}(f)$, are called a TOCTTOU pair.

It is useful to identify the TOCTTOU pairs explicitly, since the combinations that yield such pairs are non-trivial but manageable. The diagram in FIG. 1 shows all the AbsFS operations and the two states in which a file may be. On the left side of diagram is the non-existent state, denoted by $resolve(f)=\emptyset$ and on the right side of the diagram is the existent state, denoted by $resolve(f)=b$.

It is now analyzed first the non-existent state and the invariant $resolve(f)=\emptyset$. The first term of a TOCTTOU pair is an operation that results in the non-existent state of f. From the state transition diagram in FIG. 1, it can be seen that two operations lead to the non-existent state: {check, removal}. The removal operation explicitly makes f non-existent, while the check operation also ends in the non-existent state if it does not find the pathname mapping. The second term of the TOCTTOU pair is an operation that starts from the invariant $resolve(f)=\emptyset$ (the non-existent state). The two operations that start from the non-existent state are: {check, creation}. Therefore, the TOCTTOU pairs associated with the non-existent state are contained in the set produced by the Cartesian product of {check, removal}×{check, creation}. The Cartesian product of two sets X and Y is the set of all possible ordered pairs whose first component is a member of X and whose second component is a member of Y.

While the Cartesian product contains all the TOCTTOU pairs, the second term, which corresponds to the "Use" part of the TOCTTOU pair, can be refined. For an attacker to exploit a TOCTTOU vulnerability for some gain (e.g., escalation of privileges), the victim must be tricked into doing something useful for the attacker in the "Use" part. Examples of useful actions are: (1) set or modify the status information of an existing file object (e.g. make /etc/passwd world-writable); (2) modify the runtime environment of the victim application (e.g. change the current directory); and (3) release the content of a sensitive file object (e.g. read the content of /etc/shadow into memory). Since the check operation does not produce any useful results for the attacker, exploitable TOCTTOU pairs can be defined by eliminating the check operation from the second term of TOCTTOU pairs.

Now the existent state of f, characterized by the invariant $resolve(f)=b$, can be analyzed. The state transition diagram in FIG. 1 shows that the set of operations that lead into the existent state is {creation, check, normal use}, and the set of operations that start from the existent state is {check, normal use, removal}. So the TOCTTOU pairs associated with this invariant are in the set {creation, check, normal use}□{check, normal use, removal}. As a second term of the TOCTTOU pairs, check will not produce useful results for the attacker. Consequently, check can be eliminated from the list of exploitable TOCTTOU pairs.

By deleting check from the second terms, the exploitable TOCTTOU pairs are {check, removal}×{creation} for the first invariant and {creation, check, normal use}□{normal use, removal} for the second invariant. Since there are only two invariants in AbsFS, all the exploitable TOCTTOU pairs in Table 1 below have been enumerated.

Proposition 2: The enumeration of TOCTTOU pairs in Table 1 is complete, i.e., it contains all the exploitable TOCTTOU pairs in AbsFS.

By construction the exploitable TOCTTOU pairs in Table 1 have been enumerated. There are only two invariants in the state diagram in FIG. 1, and all the state transitions in FIG. 1 have been analyzed.

TABLE 1

Exploitable TOCTTOU Pairs (AbsFS)

| Invariant | TOCTTOU Pairs |
| --- | --- |
| $resolve(f) = \emptyset$ | <check, creation> |
|  | <removal, creation> |
| $resolve(f) = b$ | <creation, normal use> |
|  | <check, normal use> |
|  | <normal use, normal use> |
|  | <creation, removal> |
|  | <check, removal> |
|  | <normal use, removal> |

TABLE 2

Enumeration of Exploitable TOCTTOU Pairs (Unix-Style File Systems)

| Invariant | Exploitable TOCTTOU Pairs |
|---|---|
| resolve(f) = Ø | (FileCheckSet × FileCreationSet) ∪ (FileRemovalSet × FileCreationSet) ∪ (DirCheckSet × DirCreationSet) ∪ (DirRemovalSet × DirCreationSet) ∪ (LinkCheckSet × LinkCreationSet) ∪ (LinkRemovalSet × LinkCreationSet) |
| resolve(f) = b | (FileCheckSet × FileNormalUseSet) ∪ (FileCreationSet × FileNormalUseSet) ∪ (LinkCreationSet × FileNormalUseSet) ∪ (FileNormalUseSet × FileNormalUseSet) ∪ (DirCheckSet × DirNormalUseSet) ∪ (DirCreationSet × DirNormalUseSet) ∪ (LinkCreationSet × DirNormalUseSet) ∪ (DirNormalUseSet × DirNormalUseSet) |

Prevention of TOCTTOU Attacks

This prevention will be done in two steps. First, it is maintained explicitly the invariant for each process/user (called the holder of the invariant). Second, for every file system operation that may change the invariant, it is checked whether the invoker of the operation is the holder of the invariant. The operation is allowed if it's invoked by the holder. It is disallowed if it belongs to another process/user.

Figure 2:
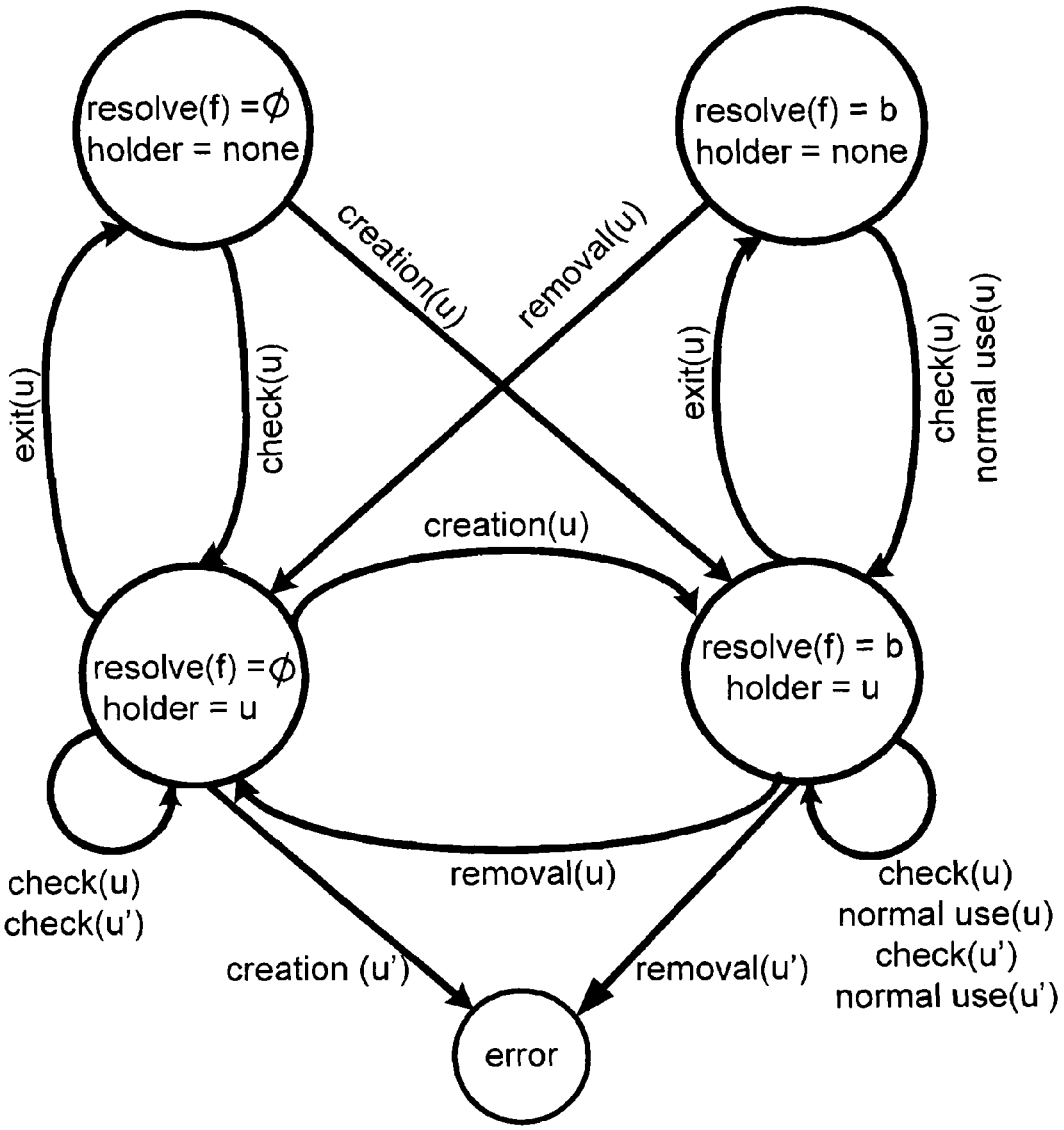
FIG. 2 depicts an enhanced state transition diagram with two users.

In FIG. 1, it is described the state transitions of a file with a single process/user. FIG. 2 shows the state transitions of a file under concurrent access by multiple processes/users. Without loss of generality, it can be adopted the policy that the first process/user accessing the file object becomes the invariant holder. (Intuitively, the invariant is considered as an exclusive lock.) The goal of the protection mechanism is to reject any changes to the invariant except by the invariant holder.

The main difference between FIG. 1 and FIG. 2 is the addition of three states. Two of the states (on the top part of FIG. 2) are due to the explicit representation of the cases of invariants with a holder (same as FIG. 1) and without a holder (new states). These transitions are allowed, since the pathname is free and the invariant holder is not in competition with any other process/user. The third new state is at the bottom of FIG. 2, representing a potential attack since those transitions would change the invariant for the holder. These transitions are rejected as an error. The original invariant holder maintains the hold on the invariant and the invariant remains unchanged.

The implementation of invariant holder lock relies on a lock table and maps the invariant holder ID to the invariant across all TOCTTOU pairs. Consider a TOCTTOU pair $<o_1, o_2>$. When a process u accesses a pathname f through $o_1(f)$, u becomes the invariant holder, moving from the top states of FIG. 2 to one of the middle states. (Note that all four AbsFS operations are allowed in this step.) The protection mechanism uses the lock table to remember this invariant/holder mapping. The lock is released when the invariant holder process ends. These state transitions are denoted as exit(u), in which case u releases the invariant.

While the pathname f is in one of the middle states, with invariant holder u, another process/user (u') may attempt to change the invariant, which will result in "error". Other operations that do not affect the invariant (e.g., check and normal use) are allowed, as shown in FIG. 2. Thus this mechanism implements the assumption required in Proposition 2 to protect the invariants across TOCTTOU pairs.

For practical purposes, the protection mechanism does not require explicit request and release of invariant-related locks. The management of invariant locks can be done automatically on behalf of applications. Furthermore, the implementation can be simplified with the following proposition.

Proposition 3: Blocking the creation and removal of a file object f across a sequence $o_1(f), o_2(f), \ldots, o_n(f)$ is sufficient to make the sequence safe.

By Definition 5, a sequence of execution $o_1(f), o_2(f), \ldots, o_n(f)$ is safe if $\forall i, 1 \leq i \leq n-1$, resolve(f) is an invariant between $o_i(f)$ and $o_{i+1}(f)$. If any creation or removal of f across $o_1(f), o_2(f), \ldots, o_n(f)$ is forbidden, creation or removal of f between $o_i(f)$ and $o_{i+1}(f)$ is also forbidden, and since creation and removal are the only operations that can change resolve(f), resolve(f) must be an invariant between $o_i(f)$ and $o_{i+1}(f)$. So $o_1(f), o_2(f), \ldots, o_n(f)$ is guaranteed to be a safe sequence of execution.

Proposition 4: Making all exploitable TOCTTOU pairs safe is sufficient to make all file access sequences safe and prevent TOCTTOU attacks.

Proposition 3 shows the preservation of invariants through a file operation sequence suffices in making the sequence safe. Proposition 2 shows that all exploitable TOCTTOU pairs have been enumerated. Combining the two propositions it can be assured that making all file operation sequences safe (for each process/user) can prevent all TOCTTOU vulnerabilities from being exploited.

The above knowledge can be applied to concrete file systems. The AbsFS contains a simplified model of file system objects, with a very simple mapping of pathname to logical disk blocks, without any additional file system attributes such as access control. In concrete file systems, appropriate access control attributes need to be set to prevent trivial unauthorized file access.

Table 1 gives a complete list of TOCTTOU pairs in AbsFS. Now the AbsFS can be mapped into Unix-style file systems. The first observation in the mapping is that Unix-style file systems have several kinds of file system objects: regular files, directories, and links. The second observation is that the abstract operations of check, creation, normal use, and removal may be implemented by several system calls. Therefore, these abstract operations are mapped into sets of system calls (CreationSet, NormalUseSet, RemovalSet and CheckSet) and these sets are divided into operations on each kind of file system objects.

CreationSet=FileCreationSet∪DirCreationSet∪Link CreationSet

NormalUseSet=FileNormalUseSet∪DirNormalUseSet

RemovalSet=FileRemovalSet∪LinkRemovalSet∪Dir RemovalSet

CheckSet=FileCheckSet∪LinkCheckSet∪DirCheckSet

The third observation is that the removal operation in Unix-style file systems does not produce any useful results for the attacker. This is because in Unix-style file systems, under the assumption of careful file attribute settings, there are only two ways for the attacker to make resolve(f)=resolve(t) in a TOCTTOU attack (t is an existing security sensitive file object such as /etc/passwd and f is the file object accessed by a TOCTTOU pair $<o_1, o_2>$ in the victim application): via symbolic link or hard link. If the attacker replaces f with a symbolic link to t, then the victim's removal operation on f only removes f itself, but not t; If the attacker replaces f with a hard link to t, this will increase the number of hard links of t by 1, and when the victim performs the removal operation on f, it decreases the number of hard links of t by 1 (restores the original hard link number of t, but never decreases it). Since t is physically removed only when its hard link number becomes 0, given t's initial hard link number is nonzero, the attacker can not cause t to be removed.

Thus for Unix-style file systems it can be eliminated those TOCTTOU pairs with removal as the second term from Table 1. The remaining AbsFS TOCTTOU pairs can be mapped to Unix-style file systems as shown in Table 2. For an actual file system, the actual file system calls can be mapped to these sets to obtain the concrete TOCTTOU pairs.

The same mapping can be done with the other flavors of Unix file systems. The POSIX mapping is shown in Table 3 and the Linux mapping is shown in Table 4. Compare Table 4 to Table 3 it can be seen that the sets are almost the same due to the fact that Linux is POSIX-compliant. Some discrepancy is noted though, notably the FileNormalUseSet. For example, POSIX has 6 different system calls on executing a program (execl, execle, execlp, execv, execve, execvp), but Linux only has one (execve). A closer look at the Linux implementation reveals that Linux implements only execve as a system call and uses library calls to implement the remaining 5 POSIX interfaces, which are different wrappers on top of this basic system call.

TABLE 3

POSIX File Operations

FileCreationSet = {creat, open, mknod, mkfifo, rename}
DirCreationSet = {mkdir, rename}
LinkCreationSet = {link, symlink, rename}
FileNormalUseSet = {chmod, chown, truncate, utime, open, fopen, fdopen, popen, execl, execle, execlp, execv, execve, execvp, pathconf}
DirNormalUseSet = {chmod, chown, utime, chdir, pathconf}
FileRemovalSet = {remove, unlink, rename}
DirRemovalSet = {remove, rmdir, rename}
LinkRemovalSet = {remove, unlink, rename}
FileCheckSet = {access, stat}
DirCheckSet = {access, stat}
LinkCheckSet = {lstat, readlink}

TABLE 4

Linux File Operations

FileCreationSet = {creat, open, mknod, rename}
DirCreationSet = {mkdir, rename}
LinkCreationSet = {link, symlink, rename}
FileNormalUseSet = {chmod, chown, truncate, utime, open, execve}
DirNormalUseSet = {chmod, chown, utime, mount, chdir, chroot, pivot_root}
FileRemovalSet = {unlink, rename}
DirRemovalSet = {rmdir, rename}
LinkRemovalSet = {unlink, rename}
FileCheckSet = {stat, access}
DirCheckSet = {stat, access}
LinkCheckSet = {stat, access}

Applying the mapping of Table 3 to the mapping in Table 2, it is identified 485 exploitable TOCTTOU pairs for POSIX. Similarly, by applying Table 4 to the mapping in Table 2, 224 exploitable TOCTTOU pairs for Linux are obtained.

Proposition 5: If the classification of a concrete file system's operations is complete, then the enumeration of exploitable TOCTTOU pairs is complete for the concrete file system. By complete it means that the classification contains all the concrete file system calls that operate on file objects, and all the concrete file system calls are classified into check, creation, normal use, and removal functions on the file objects. (File system calls that have multiple functions appear in multiple categories.)

Proof: The Proposition 2 guarantees the completeness of exploitable TOCTTOU pairs for the AbsFS. Assuming that the concrete file system calls have been exhaustively analyzed and classified, Proposition 5 follows from Proposition 2.

By exhaustively analyzing the POSIX file system calls (Table 3), Proposition 5 can be applied to the enumeration of exploitable TOCTTOU pairs based on Table 2 and Table 3 and it can be concluded that all the exploitable TOCTTOU pairs in POSIX have been enumerated.

Some real world programs with known TOCTTOU vulnerabilities on Unix-style systems have been studied and the results are shown in Table 5. For example, in sendmail, the TOCTTOU vulnerability is a <stat, open> pair, the invariant is resolve(umbox)=b, and the attack is first removing umbox and second creating a symbolic link under the name umbox.

TABLE 5

Some Existing TOCTTOU Vulnerabilities on Unix-style Systems

| Applications | TOCTTOU pair | Classification and Invariant |
| --- | --- | --- |
| BitKeeper, Cscope 15.5, CUPS, getmail 4.2.0, glint, Kerberos 4, openldap, OpenOffice 1.0.1, patchadd, procmail, samba, Xinetd | <stat, open> | FileCheckSet × FileCreationSet resolve(f) = Ø |
| Rational ClearCase, pppd | <stat, chmod> | FileCheckSet × FileNormalUseSet resolve(f) = b |
| Sendmail | <stat, open> | |
| logwatch 2.1.1 | <stat, mkdir> | DirCheckSet × DirCreationSet resolve(f) = Ø |
| bzip2-1.0.1, gzip, SAP | <open, chmod> | FileCreationSet × FileNormalUseSet resolve(f) = b |
| Mac OS X 10.4 - launchd | <open, chown> | |
| StarOffice 5.2 | <mkdir, chmod> | DirCreationSet × DirNormalUseSet resolve(f) = b |

Logwatch is an open-source script for monitoring log files in Linux. Recently, logwatch 2.1.1 running as root was reported to allow a local attacker to gain elevated privileges, e.g., write access to /etc/passwd. This attack consists of the following steps:

1. Get the running process ID {pid} of logwatch;
2. Create a temporary directory named /tmp/logwatch.{pid};
3. Create a symbolic link with a specific name in the temporary directory, which points to /etc/log.d/scripts/logfiles/samba/'cd etc; chmod 666 passwd #'
4. Wait for logwatch to use the temporary symbolic link. Although logwatch only opens it for writing, the tricky file name causes the shell to execute it as a command line later.

The TOCTTOU pair in logwatch is <stat, mkdir>. logwatch first checks whether the directory/tmp/logwatch.{pid} exists (stat) before creating it. However, an attacker may create that directory (as shown above) between the stat and mkdir system calls. In this case, logwatch's mkdir fails, but since logwatch does not check the status code of its mkdir, it continues blindly and uses the temporary directory. The invariant in logwatch is resolve(tmpdir)=Ø and the attack is a creation operation (mkdir) by the attacker. (Here the tmpdir is /tmp/logwatch.{pid})

An actual TOCTTOU vulnerability consists of a victim program containing a TOCTTOU pair and an attacker program trying to take advantage of the potential race condition introduced by the TOCTTOU pair. The attacker program attempts to access or modify the file being manipulated by the victim through shared access during the vulnerability window between the "Check" and "Use" steps. For example, by adding a line to an unintentionally shared script file in the rpm attack, the attacker can trick the victim into executing unintended code at a higher privilege level (root). In general, a TOCTTOU attack is profitable if the victim is running at a higher level of privilege. In Unix-style OSs, this means the victim running as root and the attacker as normal user.

An important observation is that even though the victim is running at a higher level of privilege, the attacker must have sufficient privileges to operate on the shared file attributes, e.g., creation or deletion. This observation narrows the scope of potential TOCTTOU vulnerabilities. Table 6 shows a list of directories owned by root in Linux. Since normal users cannot change the attributes or content of files in these directories, these files are safe.

TABLE 6

Directories Immune to TOCTTOU

| /bin | /root | /usr/dict | /var/db |
|------|-------|-----------|---------|
| /boot | /proc | /usr/kerberos | /var/empty |
| /dev | /sbin | /usr/libexec | /var/ftp |
| /etc | /usr/bin | /usr/sbin | /var/lock |
| /lib | /usr/etc | /usr/src | /var/log |
| /misc | /usr/include | /usr/X11R6 | /var/lib |
| /mnt | /usr/lib | /var/cache | /var/run |
| /opt | | | |

Figure 3:
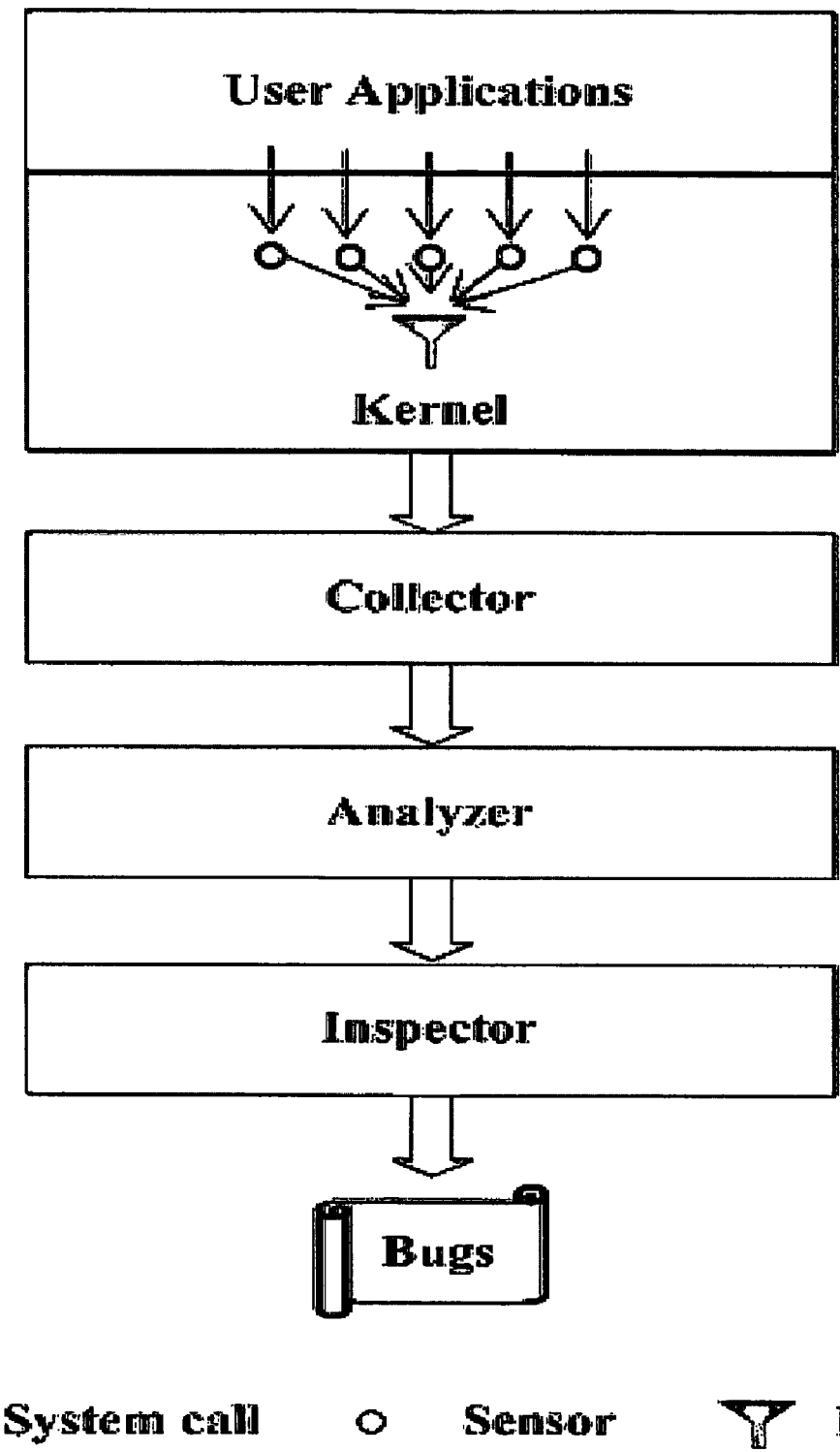
FIG. 3 illustrates a flowchart for a framework for TOCTTOU detection.

Based on the STEM model, a software framework and implemented software tools can be designed to detect actual TOCTTOU vulnerabilities in Linux. FIG. 3 shows the four components of the detection framework, based on dynamic monitoring of system calls made by sensitive applications (e.g., those that execute with root privileges). The first component of the framework is a set of plug-in Sensor code in the kernel, placed in system calls listed in Table 4. These Sensors record the system call name and its arguments, particularly file name (full path for unique identification purposes). For some system calls, other related arguments are recorded to assist in later analysis, e.g., the mode value of chmod(path, mode). Some environmental variables are also recorded, including process ID, name of the application, user ID, group ID, effective user ID, and effective group ID. This information will be used in the analysis to determine if a TOCTTOU pair can be exploited.

The Sensors component also carries out a preliminary filtering of their log. Specifically, they identify the system calls on files under the system directories listed in Table 6 and filter them out, since those files are immune to TOCTTOU attacks. After this filter, remaining potentially vulnerable system calls are recorded in a circular FIFO ring buffer by printk.

The second component of this framework is the Collector, which periodically empties the ring buffer (before it fills up). One implementation of the Collector is a Linux daemon that transforms the log records into an XML format and writes the output to a log file for both online and offline analysis.

The third component of this framework is the Analyzer, which looks for the possible TOCTTOU pairs (decided by Table 2 and Table 4) that refer to the same file pathname. For offline analysis, this correlation is currently done using XSLT (extensible Stylesheet Language Transformations) templates. This analysis proceeds in several rounds as follows.

Round 1: First, the Analyzer sorts the log records by file name, grouping its operation records such as the names and locations (sequence numbers) of system calls.

Round 2: Second, system calls on each file are paired to facilitate the matching of TOCTTOU pairs.

Round 3: Third, system call pairs are compared to a list of previously complied TOCTTOU pairs. When a TOCTTOU pair is found, an XSLT template is generated to extract the corresponding log records from the original log file.

Round 4: Fourth, the log records related to TOCTTOU pairs found are extracted into a new file for further inspection.

The fourth component of this framework is the Inspector, which identifies the actual TOCTTOU vulnerability in the program being monitored. The Inspector links the TOCTTOU pair with associated environmental information, including file pathname, related arguments, process ID, program name, user ID, group ID, effective user ID, and effective group ID. The Inspector decides whether an actual exploitation can occur.

For each TOCTTOU pair, the Inspector does the following steps:

Check the arguments of the calls to see if these calls can be profitable to an attacker. For example, if the "Use" call is chmod, then a value of 0666 for the mode argument falls into this category because this chmod can be used to make /etc/passwd world-writable. On the other hand, a mode value of 0600 is not profitable because it will not give the attacker any permission on a file that he/she does not own. In this case the TOCTTOU pair in question is not a TOCTTOU vulnerability.

Check the file pathname. For the chmod example, if the file is stored under a directory writable by an ordinary user, like his/her home directory, then continue to the next step; otherwise the TOCTTOU pair is not a TOCTTOU vulnerability.

Check the effective user ID. Continuing with the chmod example, if the effective user ID is 0 (root), then report this TOCTTOU pair as a vulnerability; otherwise, the TOCTTOU pair is not a vulnerability.

It should be noted that the steps described above give only an outline of the Inspection process based on one attack scenario for one particular TOCTTOU pair. For different TOCTTOU pair and different attack scenario, the details of these checks can be different. For example, the same TOCTTOU pair as the above with a mode value of 0644 and the same other conditions is also considered a vulnerability because it can be exploited to make /etc/shadow readable by an attacker. Thus the Inspector requires a template (or signature) for each kind of attack scenario. Table 7 shows the set of templates used by the current implementation of the Inspector. For brevity, this table does not show the file pathname and effective user ID which are checked in every template. This set may be expanded as new attack scenarios are found.

TABLE 7

Templates used in the Inspector

| Use-Call | Arguments to check | Sample attack scenarios |
| --- | --- | --- |
| chmod | mode | Gain unauthorized access rights to /etc/passwd |
| chown | owner, group | Change the ownership of /etc/passwd |
| chroot | | Access information under a restricted directory |
| execve | | Run arbitrary code |
| open | mode, flag | Mislead privileged programs to do things for the attacker, or steal sensitive information |
| truncate | length | Erase the content of /etc/passwd |

From the discussion above, the focus is on system software programs that use file system (outside the directories listed in Table 6) as a root. Each program chosen is downloaded, installed, configured, and deployed. Furthermore, a testing environment which includes the design and generation of a representative workload for each application it also built, plus the analysis of TOCTTOU pairs observed. Although this is a laborious process that requires high expertise, one could imagine incorporating such testing environments into the software release of system programs, facilitating future evaluations and experiments.

The tools were implemented on Red Hat 9 Linux (kernel 2.4.20) to find TOCTTOU vulnerabilities in about 130 commonly used utility programs. The script-based experiments consist of about 400 lines of shell script for 70 programs in /bin and /sbin. This script takes about 270 seconds to gather approximately 310 K bytes of system call and event information. The other 60 programs were run manually using an interactive interface. From this sample of Linux system utilities, it was found 5 potential TOCTTOU vulnerabilities (see Table 8).

The experiments were run on an Intel P4 (2.26 GHz) laptop with 256M memory. The Collector produces an event log at the rate of 650 bytes/sec when the system is idle (only background tasks such as daemons are running), 11 KB/sec during the peak time a large application such as OpenOffice is started, and 2 KB/sec on average. The Analyzer processes the log at the speed of 4 KB/sec.

TABLE 8

Potential TOCTTOU Vulnerabilities in Linux Utility Programs

| Application | TOCTTOU errors | Possible exploit |
| --- | --- | --- |
| vi | <open, chown> | Changing the owner of /etc/passwd to an ordinary user |
| gedit | <rename, chown> | Changing the owner of /etc/passwd to an ordinary user |
| emacs | <open, chmod> | Making /etc/passwd writable by an ordinary user |
| rpm | <open, open> | Running arbitrary command |
| esd | <mkdir, chmod> | Gaining full access to another user's home directory |

The Unix "visual editor" vi is a widely used text editor in many UNIX-style environments. For example, Red Hat Linux distribution includes vi 6.1. Using the tools, it was found potential TOCTTOU vulnerabilities in vi 6.1. Specifically, if vi is run by root to edit a file owned by a normal user, then the normal user may become the owner of sensitive files such as /etc/passwd.

The problem can be summarized as follows. When vi saves the file (f) being edited, it first renames the original file to a backup (f'), then creates a new file under the original name (f). The new file is closed after all the content in the edit buffer has been written to it. Because this new file is created by root (vi runs as root), its initial user is set to root, so vi needs to change its owner back to the original user (the normal user). This forms a <open, chown> window of vulnerability every time vi saves the file. During this window, if the value of resolve(f) can be changed to resolve(/etc/passwd), vi can be tricked into changing the owner of /etc/passwd to the normal user.

In the evaluation of the TOCTTOU vulnerability in vi, it is measured the percentage of time when vi is running in its vulnerability window as it saves the file being edited. In vi, this depends on the edited file size. In the experiments, the user typing time is bypassed to avoid the variations caused by human participation.

Figure 5:
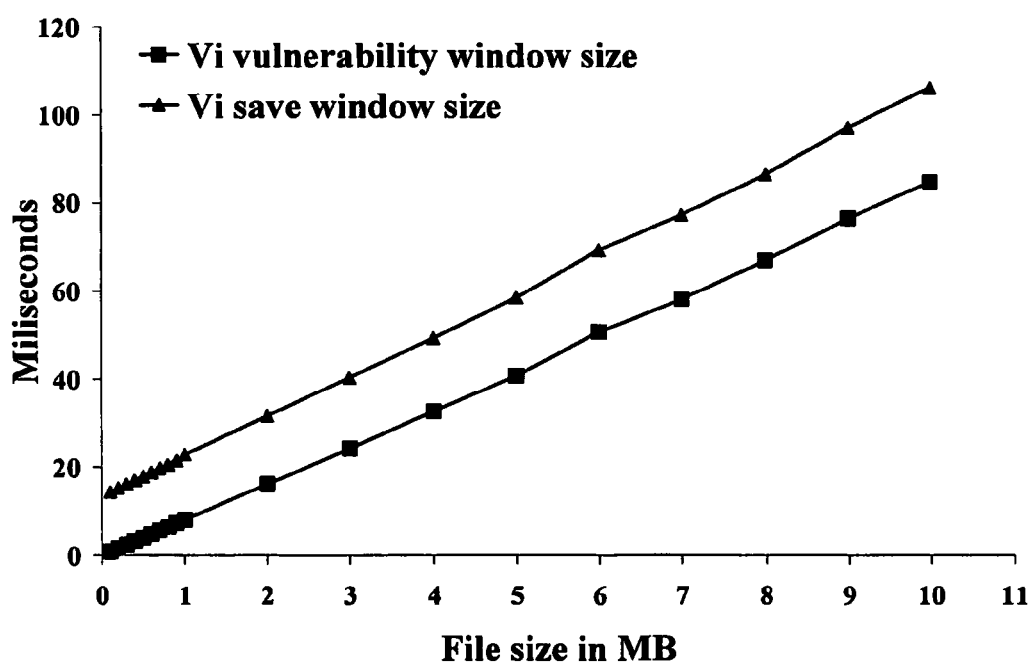
FIG. 5 illustrates the vulnerability and save window sizes of vi.

It is defined a save window t as the time vi spends in processing one "save" command, and the vulnerability window v during which TOCTTOU attack may happen. It has been measured 60 consecutive "saves" of the file for t, and timestamp the open and chown system calls for v. Since the "save" time of a file depends on the file size, a set of experiments on different file sizes is conducted. FIG. 5 shows the time required for a "save" command for files of sizes from 100 KB to 10 MB. It was found a per file fixed cost that takes about 14 msec for the small (100 KB) file and an incremental cost of 9 msec/MB (for files of size up to 10 MB).

Figure 4:
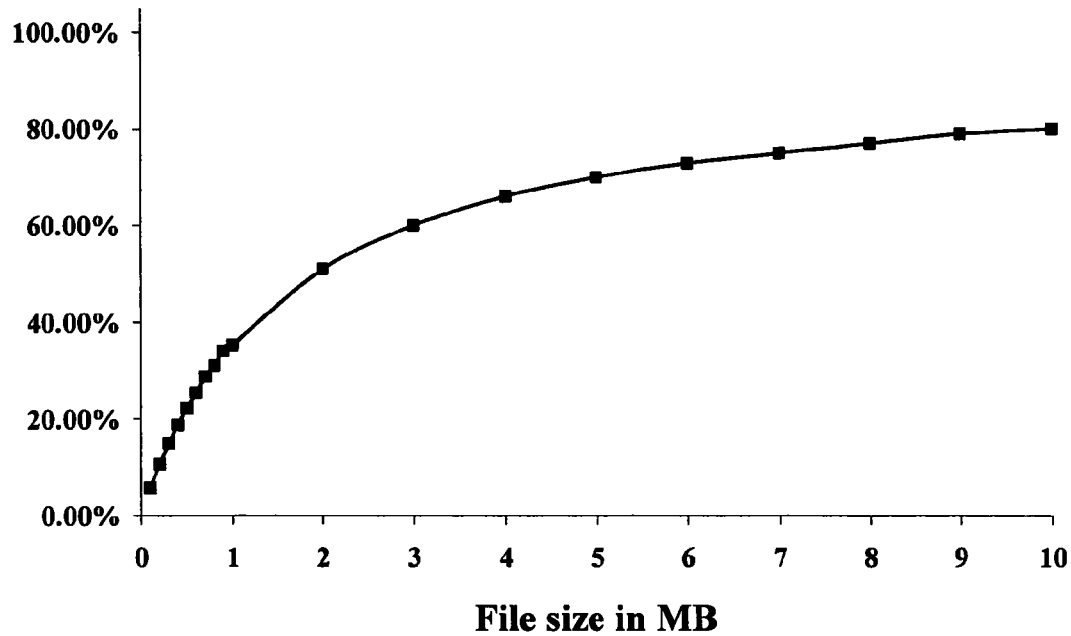
FIG. 4 illustrates a window of vulnerability divided by total save time as a function of file size.

Since chown happens after the file is completed, the window of vulnerability v follows approximately the same incremental growth of 9 msec/MB (see FIG. 5). FIG. 4 shows the window of vulnerability to be relatively long compared to the total "save" time. It gradually grows to about 80% of the "save" total elapsed time for 10 MB files. This experiment tells us that vi is more vulnerable when the file being edited is larger. For a small file (100 KB size) the window of vulnerability is still about 5% of the "save" time.

Unlike a batch program which can be easily run from a script, vi is designed for interactive use by humans. To eliminate the influence of human "think time" in the experiments, another program is developed to interact with vi by sending it commands that simulate human typing. This reduces the run-time to minimum. The experiment runs a vi (as root) editing a file owned by the attacker in the attacker's home directory. The editing consists of either appending or deleting a line from the file and the experiment ends with vi exiting.

Figure 6:
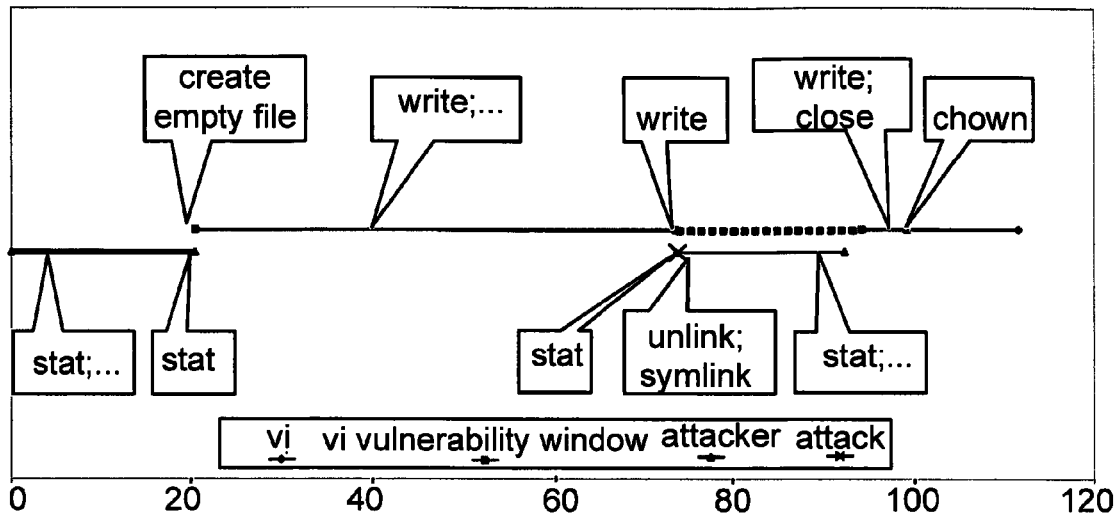
FIG. 6 illustrates an event analysis of the vi exploit.

The attack consists of a tight loop constantly checking (by stat-ing) whether the owner of the file f has become root, which signifies the start of the window of vulnerability. Once this happens, the attacker replaces f with a symbolic link to /etc/passwd. When vi exits, it should change the ownership of /etc/passwd to the attacker. FIG. 6 shows the events in a successful exploit of vi. The upper line shows the events of the vi process, and the lower line shows the events of the attacker process. The lighter part of the upper line corresponds to the vi vulnerability window. In FIG. 6, vi is suspended at some point in its vulnerability window (around 75 milliseconds) and the attacker process is scheduled which replaces f with a symbolic link to /ect/passwd. As a result, the open(f) and chown(f) operations of vi become an unsafe sequence of execution, and the attack succeeds. The attack is a removal (unlink) followed by a creation (symlink).

Due to the non-deterministic nature of TOCTTOU, the attack experiment was performed for as many as 500 times to obtain a statistically meaningful result. Contrary to the relatively wide window of vulnerability in FIG. 4, it is found a relatively low probability of success in the vi case (see FIG. 7 and FIG. 8). This leads to a more careful analysis of the system events during the attack.

Although the window of vulnerability may be wide, an attack will succeed only when:
1. vi has called open to create the new file,
2. vi has not called chown,
3. vi relinquishes CPU, voluntarily or involuntarily, and the attacker is scheduled to run, and
4. the attacker process finishes the file redirection during this run.

The first two conditions have been studied in the baseline experiment. The fourth condition depends on the implementation of the attacker program. For example, if the attacker program is written in C instead of shell script, it will be less likely to be interrupted.

The third condition is the least predictable. In the experiments, it was found several reasons for vi to relinquish CPU. First, vi may suspend itself to wait for I/O. This is likely since the window of vulnerability includes the writing of the content of the file, which may result in disk operations. Second, vi may use up its CPU slice. Third, vi may be preempted by higher priority processes such as ntpd, kswapd, and bdflush kernel threads. Even after vi relinquishes CPU, the second part of the condition (that the attacker process is scheduled to run) still depends on other processes not being ready to run.

This analysis illustrates the highly non-deterministic nature of a TOCTTOU attack. To achieve a statistically meaningful evaluation, the experiments were repeated and the probability of attack success was computed. To make the experimental results reproducible, it was eliminated all the confounding factors that were identified. For example, in each round of experiments, vi was executed at least 50 times, each time on a different file, to minimize file caching effects. It is also observed memory allocation problems after large files have been used. To relieve memory pressure, it is added a 2-second delay between successive vi invocations.

Figure 7:
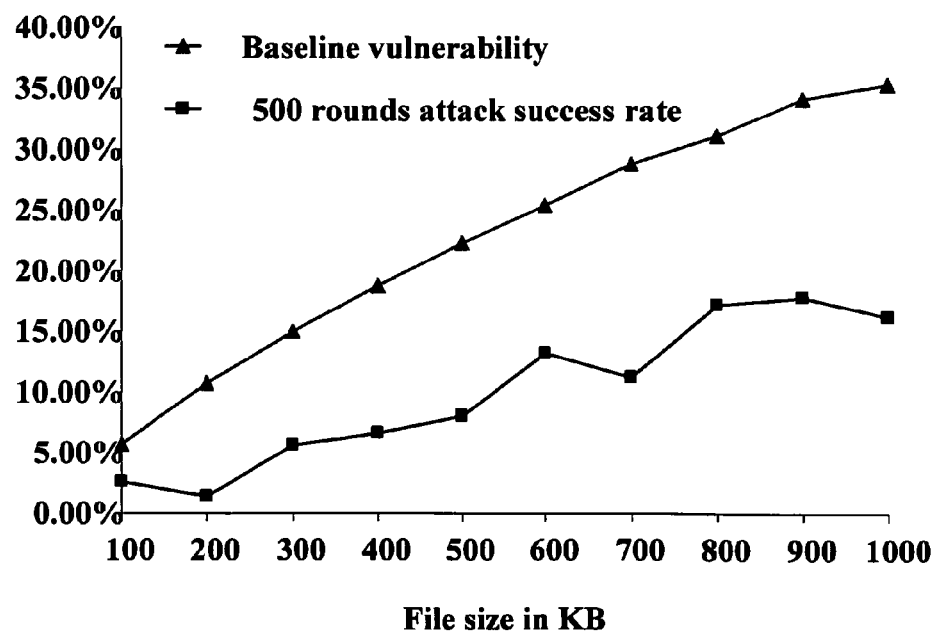
FIG. 7 illustrates the success rate of attacking vi on small files.

FIG. 7 shows the success rate for file sizes ranging from 100 KB to 1 MB averaged over 500 rounds. It is observed that for small files, there is a rough correlation between the size of window of vulnerability and success rate. Although not strictly linear, the larger the file being edited, the larger is the probability of successfully attacking vi.

Figure 8:
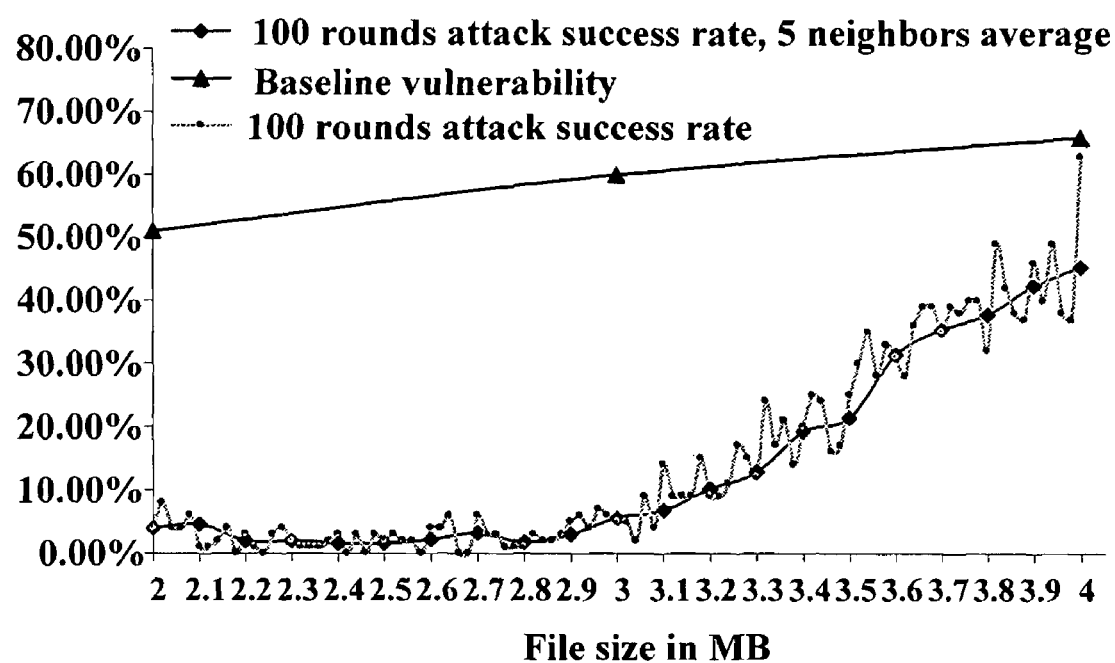
FIG. 8 illustrates the success rate of attacking vi on large files.

FIG. 8 shows the results for file sizes ranging from 2 MB to 4 MB, with a stepping size of 20 KB, averaged over 100 rounds. Unlike the dominantly increasing success rate for small file sizes, it was found apparently random fluctuations on success rates between file sizes of 2 MB and 3 MB, probably due to race conditions. For example, files of size 2 MB have success rate of 4%, which is lower than the 8% success rate of file size 500 KB in FIG. 7. The growing success trend resumes after files become larger than 3 MB.

In the experiments, it was identified 5 TOCTTOU pairs (see Table 8) and confirmed 3 of them through direct attacks (rpm, vi, and emacs). It also tried to attack gedit, the fourth vulnerability discovered, but it was found a very low probability of successful attack. Like vi, gedit becomes vulnerable when it saves the file being edited. Unlike vi, gedit writes to a temporary scratch file, then renames the scratch file to the original file name, and calls chown. Thus the window of vulnerability is between the rename and the directly following chown, a very short time that reduces the probability of successful attack.

The fifth vulnerability is the Enlightened Sound Daemon (esd), which creates a directory /tmp/.esd then changes the access mode of this directory to 777, giving full permissions (read/write/execute) to all users. Besides, this directory is under /tmp, a place where any user can create files or directories. So a possible attack is to create a symbolic link /tmp/.esd before the mkdir call of esd and let the link point to some directories owned by the running user (such as his/her home directory). If esd does not check whether its mkdir call succeeds, then it will change the access mode of the running user's home directory to 777: Then an attacker has full access to the running user's home directory.

The STEM-Model excludes careless programming, assuming that a precondition is established by the "Check" part before the "Use" part relies on it. In programs where preconditions are not explicitly established (a bad programming practice), e.g., a program creates a temporary file under a known name without first stat-ing the existence of the file, exploits may happen outside the STEM model.

Tool-based detection of vulnerabilities typically does not achieve 100% precision. The framework described above is no exception. There are some technical sources of false positives:
1. Incomplete knowledge of search space: The list of immune directories (Table 6) is not complete because of the dynamic changes to system state (e.g. newly created root-owned directories under /usr/local), which leads to false positives.
2. Artifacts of test environment: If the test cases themselves uses /tmp or the home directory of an ordinary user, the tools have to report related TOCTTOU pairs, which are false positives. For example, the initial test case for cpio uses a temporary directory /tmp/cpio, so the tools reported a <stat, chdir> on this directory.
3. Coincidental events: Because the tools do system-wide monitoring, they capture file system calls made by every process. Sometimes two unrelated processes happen to make system calls on the same file that appear to be a TOCTTOU pair.
4. Incomplete knowledge of application domain: Not every TOCTTOU pair is profitably exploitable. For example, the application rpm invoked by "--addsign" option contains a <stat, open> pair, which can open any file in the system for reading, such as /etc/shadow. However, rpm can not process /etc/shadow because it is not in the format recognizable by rpm. So it is unlikely that this pair can be exploited to undermine a system.

By improving the kernel filter (source 1), re-designing test cases (source 2), and reducing concurrent activities (source 3), the false positive of the tools is reduced; for example, in one experiment testing 33 Linux programs under /bin, the false positive rate fell from 75% to 27%. However, source 4 is hard to remove due to the differences among application domains.

Based on the discussion above, an event driven approach, called EDGI (Event Driven Guarding of Invariants), to defend applications against TOCTTOU attacks can be introduced. The design requirements of EDGI are:
1. It should solve the problem within the file system, and does not change the API, so that existing or future applications need not be modified.
2. It should solve the problem completely, i.e., no false negatives.
3. It should not add undue burden on the system, i.e., very low rate of false positives.
4. It should incur very low overhead on the system.

EDGI consists of three design steps, a concrete implementation, and an experimental evaluation. The first design step is to map the STEM model into invariants in a concrete file system and the kernel calls that preserve the invariants. The second design step uses ECA (event-condition-action) rules to model the concrete invariant preservation methods, so there is reasonable assurance the invariants are indeed preserved. The third design step completes the design by addressing the remaining issues such as the automated inference of invariant scope and inheritance of invariants by children processes.

Under the STEM model's assumption, the "Check" part of a sequence of operations on a file object creates an invariant that should be preserved through to the corresponding "Use" part. Specifically, a file certified to be non-existent (resolve(f)=Ø) by the "Check" operations should remain non-existent until the "Use" operations create it. Similarly, a file certified to be existent (resolve(f)=b) by the "Check" operations should remain the same file until the "Use" part (by the same user) accesses it. Identifying and preserving these two invariants (resolve(f)=Ø or resolve(f)=b) are the main goals of EDGI approach.

The EDGI design treats an invariant as a sophisticated lock. The user invoking a "Check" call becomes the owner of the lock, and the lock is usually held by the same user through the "Use" call. Due to the complications of Unix file system, the invariant handling is more complicated than a normal lock compatibility table.

The EDGI approach adopts a modular design and implementation strategy by separating the EDGI invariant processing from the existing kernel. The invariant-related information is maintained as extra state information for each file object. When an invariant-related event is triggered, the corresponding set of conditions is evaluated and if necessary, appropriate actions are taken to maintain the invariant.

The invariant-related information for each file object includes its state (free or actively used), a tainted flag, invariant holder user ID and a process list. In detail:
  refcnt—the number of active processes using the file object. When refcnt=0, the file object is free.
  tainted—when refcnt>0, this flag means whether the name to disk object binding can be trusted.
  fsuid—the user ID of the processes that are actively using the file object.
  gh_list—a doubly-linked list, in which each node contains a process ID and the timestamp of the last system call made by the process on the file object.

Two kinds of events trigger condition evaluation:
File system calls such as access, open, mkdir, etc.
Process operations: fork, execve, exit.

The conditions evaluated by each event and their associated actions are summarized in Table 9 (f denotes the file object). The conditions refer to the file object status (whether the invariant is resolve(f)=Ø or resolve(f)=b), and actions include the creation, removal and potentially more complex invariant maintenance actions.

EDGI prevents TOCTTOU attacks by making the sequence of system calls on a file object safe. As suggested by Proposition 3, the invariant maintenance rules in Table 9 are not restricted to a TOCTTOU pair, but extend to a sequence of file system calls. During the time such a sequence of accesses exists, the file object is said to be actively used. Otherwise the file object is said to be free.

The interval during which the file object is actively used forms the scope of its invariant. The scope varies in length, depending on the number of consecutive "Use" calls made by the application. Consequently, a significant technical challenge is to correctly identify this scope—the boundaries of the TOCTTOU vulnerability window of the application. Since current Unix-style file systems are oblivious to such application-level semantics, the scope needs to be inferred, so no changes are imposed on the applications or the file system interfaces.

The inference of invariant scope is guided by the STEM model, which specifies the initial TOCTTOU pair explicitly. The "Use" call of the initial pair becomes the "Check" call of the next pair, completed by the following "Use" call. According to Proposition 2, the STEM model correctly captures the TOCTTOU problem. The invariant of the initial pair is maintained from the "Check" call through the "Use" call, and then to the additional "Use" calls. The sequence continues until the program ends, a time-out or preemption occurs. In summary, the scope of an invariant is a safe sequence of system calls (Definition 5).

There are some additional issues that need to be resolved for an implementation. First, if the invariants is considered as similar to locks, then the question of dead-lock and live-lock arises. For example, it is possible that an invariant holder is a long-running process which only touches a file object at the very beginning and then never uses it again. Consequently, a legitimate user may be prevented from creating/deleting the file object for a long time, resulting in denial of service. This problem can be addressed by a time out mechanism. If an invariant holder process does not access a file object for an exceedingly long time, the invariant will be temporarily disabled to allow other legitimate users to proceed.

If the time-out results in simple preemption (i.e., breaking the lock), then this method may be used to attack very long application runs. To prevent the preemption-related attack, it is use a tainted bit to mark the preemption. After a preemption-related file creation or deletion, the invariant no longer holds. EDGI marks the file object as tainted, so the next access request from the original invariant holder will be aborted.

The second and related issue is the relationship between the current invariant holder and the next process attempting to access the file object. Up to now, it has been assumed a symmetric relationship, without distinguishing legitimate users from attackers. In reality, some processes are more trustworthy than others. Specifically, in Unix environments the file object owner and root processes can be trusted completely. Consequently, these processes are allowed to "break the lock" by preempting other invariant holders. Concretely, when the file object owner or root process attempt to access a file object, they immediately become the invariant holder, and the invariant for the former holder is removed.

The third issue is the inheritance of invariants by children processes. For example, after a user process checks on a file object and becomes an invariant holder, it spawns a child process, and terminates. In the mean time, the child process continues, and uses the file object. In the simple solution, the invariant is removed when the owner (parent) process terminates. In this case an attacker can achieve a TOCTTOU attack before the child process uses the file. Thus the scope of invariants must extend to the child process at every process creation.

A final issue is whether the EDGI approach is a complete solution, capable of stopping all TOCTTOU attacks. For every file system call, the rules summarized in Table 9 are checked and followed. The first time a "Check" call is invoked on a file object, that user becomes the file object's invariant holder. At any given time there is at most one invariant holder for each file object. Users other than the invariant holder are not allowed to create or remove the file object (including changes to mapping between the name and disk objects). Therefore, the EDGI defense is able to stop all TOCTTOU attacks identified by the STEM model.

that keeps track of the processes that are actively using each file object. The index to this hash table is the file pathname, and for each entry, a list of process ids is maintained. The modular implementation augments the existing directory entry (dentry) cache code and extends its data structures with the fields: fsuid, refcnt, tainted, gh_list.

Before a system call uses a file object by name, it first needs to resolve the pathname to a dentry. The implementation instruments the Linux kernel to call the invariant holder tracking algorithm after each such pathname resolution. There are two possible approaches to implementing this algorithm. The first is to instrument the body of every system call (e.g., sys_open) that uses a file pathname as argument. The second is to instrument the pathname resolution functions themselves (in the Linux case, link_path_walk and lookup_hash).

The first approach has the disadvantage that instrumented code has to spread over many places, making testing and maintenance difficult. The second approach has the advan-

TABLE 9

Invariant Maintenance Rules in EDGI

| Name | Event | Condition | Action |
|---|---|---|---|
| Incarnation rule | Any system call on f | refcnt == 0 | Set f's state as actively used (refcnt++); set its tainted flag as false, fsuid as current user ID, record current pid and current system time in the gh_list. |
| Reinforcement rule | Any system call on f | refcnt > 0 and fsuid == current user ID and tainted == false | Record current pid and current system time in the gh_list. |
| Abort rule | Any system call on f | refcnt > 0 and fsuid == current user ID and tainted == true | Record current pid and current system time in the gh_list. Return an error. |
| Root preemption rule | Any system call on f | refcnt > 0 and fsuid != current user ID and current user ID == root | Remove all invariant holders information from the gh_list; set f's fsuid as current user ID, set refcnt as 1, tainted as false, record current pid and current system time in the gh_list. |
| Owner preemption rule | Any system call on f | refcnt > 0 and fsuid != current user ID and current user ID != root and fsuid != root and current user is the owner of f | Remove all invariant holders information from the gh_list; set f's fsuid as current user ID, set refcnt as 1, tainted as false, record current pid and current system time in the gh_list. |
| Invariant maintenance rule 1 | Any system call in the Removal Set on f | refcnt > 0 and fsuid != current user id | Traverse the gh_list to get the latest timestamp t, compute the interval between t and current time, if it is less than threshold MAX_AGE, deny the current request, otherwise grant the current request and set tainted as true. |
| Invariant maintenance rule 2 | Any system call in the Creation Set on f | refcnt > 0 and fsuid != current user id | Traverse the gh_list to get the latest timestamp t, compute the interval between t and current time, if it is less than threshold MAX_AGE, deny the current request, otherwise grant the current request and set tainted as true. |
| Clone rule | fork (parent, child) | True | For each file object that has parent in its gh_list, record child and current system time, and increment the refcnt. |
| Termination rule | Exit | True | Remove current pid from the gh_list of each file object that has it on its gh_list, and decrement the corresponding refcnt. |
| Distract rule | Execve | True | Remove current pid from the gh_list of each file object that has it on its gh_list, and decrement the corresponding refcnt. |

The implementation of the design described above consists of modular kernel modifications to maintain the invariants for every file object and its user/owner. Invariant holder tracking is accomplished by maintaining a hash table of pathnames tage that only a few (in the Linux case, exactly two) places need to be instrumented, making the testing and maintenance relatively easy. The second approach is adopted for the implementation.

The invariant holder tracking algorithm GH is shown in FIG. 9. This algorithm effectively implements the rules summarized in Table 9, and it is called right before link_path_walk and lookup_hash successfully returns. Line 1-2 of the invariant holder tracking algorithm addresses the situation where a new invariant holder is identified: invariant related data structure is initialized, including the invariant holder user ID (fsuid), the invariant holder process ID, the tainted flag, and a timestamp. After these steps, the invariant maintenance part will start applying this invariant. It can be seen that the same sequence also occurs in Line 8 and 12, where a new invariant holder is decided due to preemption. Line 3-6 address the situation where an existing invariant holder accesses the file object again. Notice that the tainted flag is checked to abort the invariant holder process if the name to disk binding of the file object has been changed by another user's process. Line 8 corresponds to the preemption of invariant from a normal user to the root. Similarly, line 12 handles the preemption by file object owner.

The invariant holder tracking algorithm needs the current process ID and current user ID runtime information, which are obtained from the current global data structure maintained by the Linux kernel.

The second part of implementation is invariant maintenance by thwarting the attacker's attempt to change the name to disk binding of a file object, which in turn is achieved by deleting or creating a file object. Two kernel functions are instrumented to perform invariant checks:

may_delete(d): this function is called to do permission check before deleting a file object d. It is added an invariant checking after all the existing checks have been passed: If d.refcnt>0 and the current user ID is not the same as d.fsuid, traverse d.gh_list to get the last access timestamp; if it is younger than MAX_AGE, return—EBUSY (file object in use and cannot be deleted). Otherwise set d.tainted as true and return 0.

may_create(d): this function is called to do permission check before creating a file object, similar invariant checking is added after all the existing checks have been passed.

The may_create kernel function is called by all the system calls in the CreationSet and the may_delete function is called by all the system calls in the corresponding RemovalSet. These invariant checks implement the Invariant Maintenance Rules 1 and 2 in Table 9.

Table 10 shows the size of EDGI implementation in Linux kernel 2.4.28. The changes were concentrated in one file (dcache.c), which was changed by about 55%. The other changes were small, with less than 5% change in one other file (namei.c), plus single-line changes in three other files. This implementation of less than 1000 lines of code (LOC) was achieved after careful control and data flow analysis of the kernel, plus some tracing.

From a top-down point of view, the methodical design and implementation process benefited from the STEM model as a starting point. Then, the ECA rules facilitated the reasoning of invariant maintenance. The rules were translated into the Invariant Holder Tracking algorithm.

Conversely, from a bottom-up point of view, the Linux kernel was organized in a methodical way. For example, it has exactly two functions (may_delete and may_create) controlling all file object status changes. By guarding these two functions, it is possible to guard all 224 TOCTTOU pairs identified by the STEM model. This kind of function factoring in the Linux kernel contributed to the modular implementation of EDGI.

TABLE 10

Linux Implementation of EDGI

| Source File | Modified Places | Original LOC | Added LOC |
| --- | --- | --- | --- |
| fs/dcache.c | 4 | 1307 | 749 |
| fs/namei.c | 5 | 2047 | 84 |
| fs/exec.c | 1 | 1157 | 1 |
| kernel/exit.c | 1 | 602 | 1 |
| kernel/fork.c | 1 | 896 | 1 |

The EDGI system design follows the STEM model, and the completeness STEM is given in Proposition 5. If the ECA rules summarized in Table 9 captures all the TOCTTOU pairs identified by the STEM model, and the invariant holder tracking algorithm in FIG. 9 implements all the rules in Table 9, and the Linux kernel implementation is correct, then the implementation should have zero false negatives.

One exception to the invariant maintenance rules is the preemption by programs running as root, which are allowed to gain the invariant and change file object status at will. This exception is safe, since if an attacker has already obtained root privileges, there is no further gain for using TOCTTOU attacks.

As discussed above, the maintenance of invariants may introduce long delays, if an invariant holder runs for a long time. These long delays can be considered a kind of false positives, since they may or may not be necessary. The exemplary implementation introduces a time-out mechanism to mitigate this problem. If another user's process wants to create/delete the file object and encounters the last access time by the invariant holder to be older than the time-out period, the new process is allowed to preempt the invariant and the file object is marked as tainted. If the original invariant holder attempts to use the file object again, then a real conflict is found. The exemplary implementation aborts the original invariant holder, although other design choices are possible.

The determination of a suitable time-out period, called MAX_AGE in Table 9, is probably dependent on each specific workload and a research question. If it is too short, an attacker may use it to abort a long running legitimate process by attempting to write to a shared file. If it is too long, another legitimate process may be delayed for a long time. A MAX_AGE of 60 seconds is set for the exemplary implementation.

A variant of the Andrew benchmark is used to evaluate the overhead introduced by EDGI defense mechanism. The benchmark consists of five stages. First, it uses mkdir to recursively create 110 directories. Second it copies 744 files with a total size of 12 MB. Third, it stats 1715 files and directories. Fourth, it greps (scan through) these files and directories, reading a total amount of 26 M bytes. Fifth, it does a compilation of around 150 source files. For every stage, the total running time is calculated and recorded.

Figure 10:
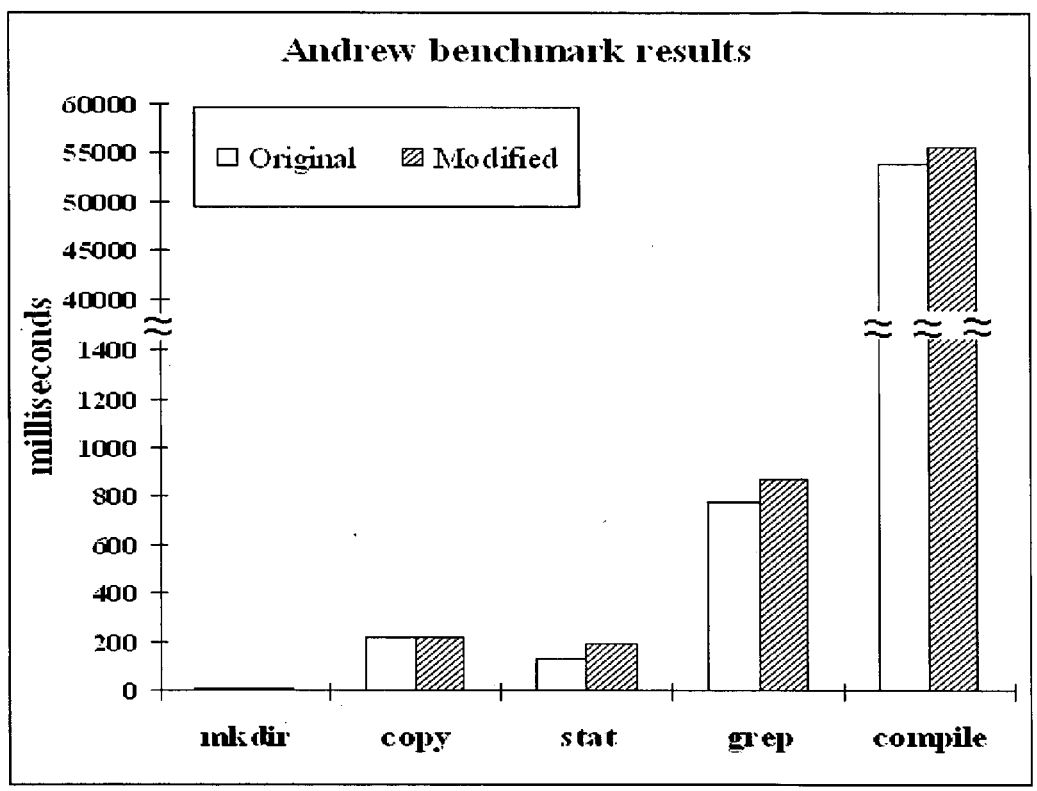
FIG. 10 illustrates results from an exemplary implementation.

The exemplary implementation was run on a Pentium III 800 MHz laptop with 640 MB memory, running Red Hat Linux in single user mode. It is reported the average and standard deviation of 20 runs for each experiment in Table 11 which compares the measurements on the original Linux kernel and on the EDGI-augmented Linux kernel. The same data is shown as bar chart in FIG. 10.

The Andrew benchmark results show that EDGI generally has a moderate overhead. The only exception is stat, which has 47% overhead. The explanation is that stat takes less time than other calls (such as mkdir), but the extra processing due to invariant holder tracking (now part of pathname resolution) has a constant factor across different calls. This constant overhead weighs more in short system calls such as stat. Fortunately, stat is used relatively rarely, thus the overall impact remains small.

TABLE 11

Andrew Benchmark Results (in milliseconds)

| Functions | Original Linux | Modified Linux | Overhead |
|---|---|---|---|
| mkdir | 6.35 ± 0.21 | 6.43 ± 0.19 | 1.3% |
| copy | 217.0 ± 1.5 | 218.6 ± 1.4 | 0.7% |
| stat | 132.0 ± 1.9 | 193.6 ± 0.8 | 47% |
| grep | 777.0 ± 4.3 | 870.1 ± 5.3 | 12% |
| compile | 53,971 ± 434 | 55,615 ± 367 | 3.0% |

PostMark benchmark is designed to create a large pool of continually changing files and to measure the transaction rates for a workload approximating a large Internet electronic mail server. PostMark first tests the speed of creating new files, and then it tests the speed of transactions. Each transaction has a pair of smaller transactions, which are either read/append or create/delete.

On the original Linux kernel the running time of this benchmark is 40.0 seconds. On EDGI-augmented kernel, with all the same parameter settings, the running time is 40.1 seconds (Again these results are averaged over 20 rounds). So the overhead is 0.25%. This result corroborates the moderate overhead of EDGI.

Figure 11:
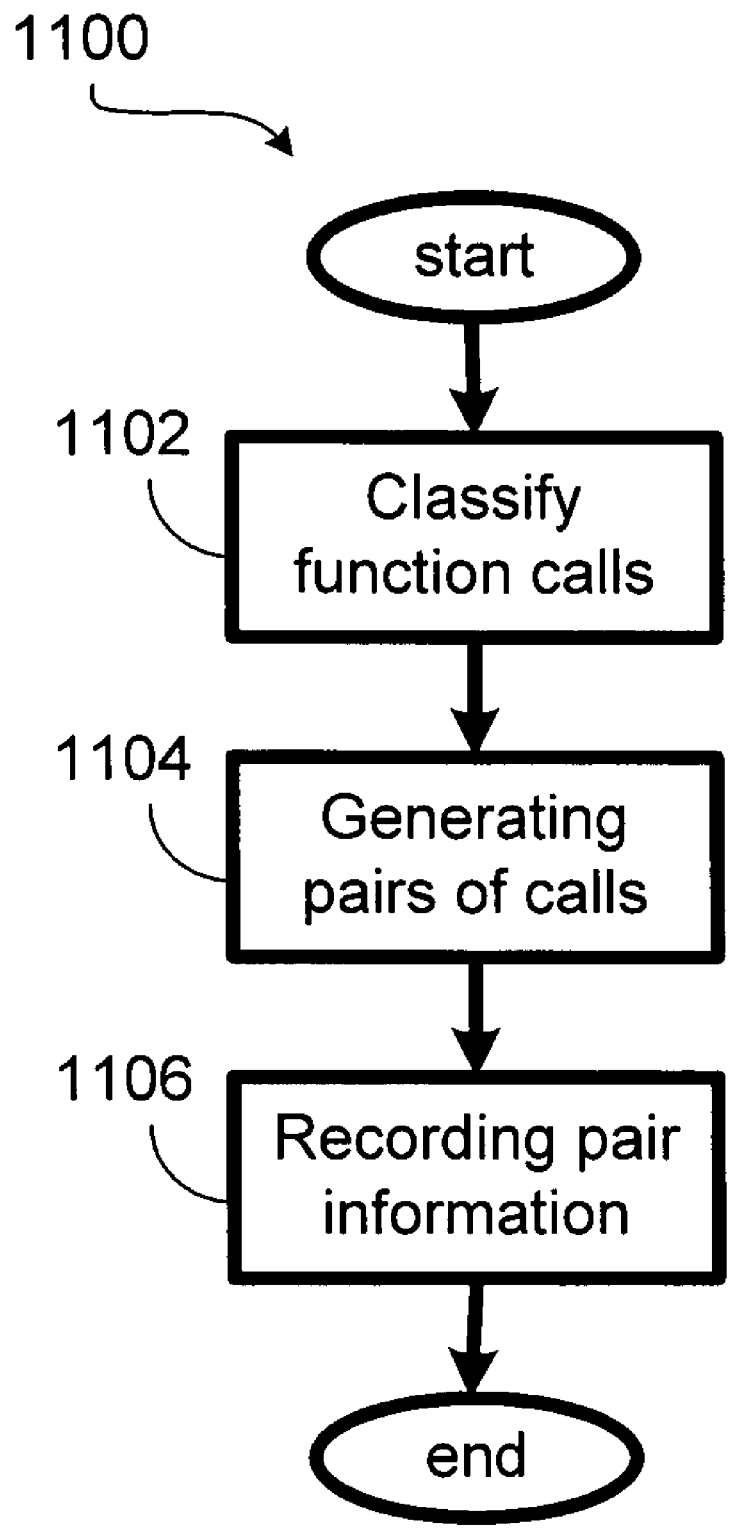
FIG. 11 illustrates a process for classifying function calls.

Based on the above discussion, it is shown that the present invention can be implemented in an operating system and reduce the vulnerability of the operating system. The method and system disclosed above allows the operating system to classify system function calls according to predefined classes and generate a full set of pairs of function calls according to a predefined criterion. This full set of function call pairs will include potential combinations of function calls between the predefined classes and two function calls within one pair are associated with one single file invariant. For example, FIG. 11 illustrates a flow chart 1100 for creating and classifying function calls in an operating system. A system function calls in a system library can be classified into different classes according to whether the function call creates a file, creates a directory, creates a link, etc., step 1102. The function call will create or otherwise associate to a file invariant when it is invoked by a process. A function call will be paired with another function call that associates to the same file invariant. After classifying the function calls, function calls can be paired according to predefined criteria, step 1104, and the information regarding the function call pairs are stored, step 1106.

Figure 12:
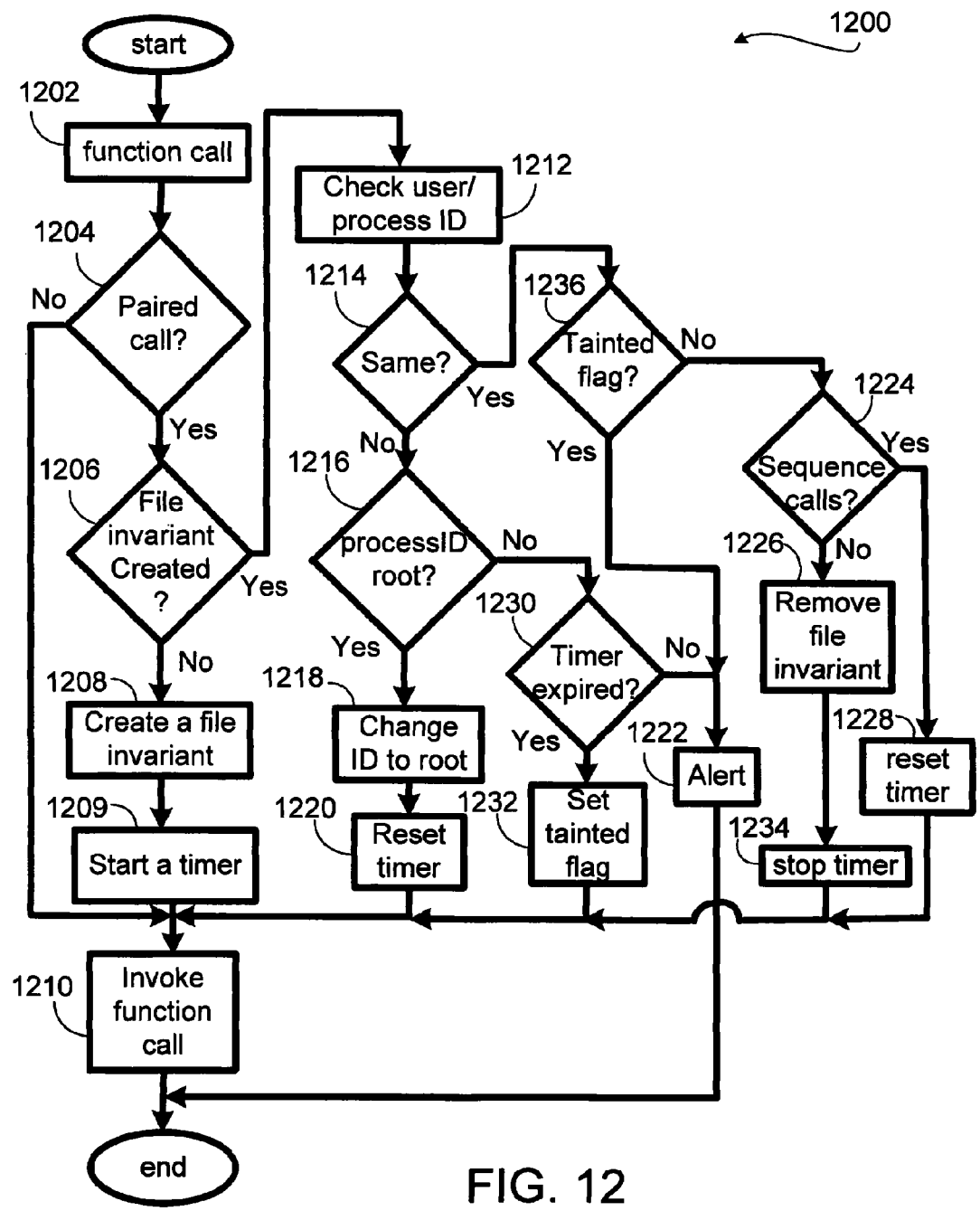
FIG. 12 illustrates a process for an operating system according to one embodiment of the invention.

FIG. 12 illustrates a flow chart for an operating system running on a computer system. When a function call is invoked, step 1202, the operating system checks if the function call is one of the paired function calls, step 1204. If it is not, then the function call is invoked normally, step 1210. If the function call is one of the paired function calls, then the operating system checks if a file invariant has been created, step 1206. If the file invariant has not been created, then the operating system creates the file invariant, step 1208, starts a timer associated with this file invariant, step 1209, and invokes the function call, step 1210. The timer helps to solve the problem created by a long running process as stated above and further discussed below. The file invariant will be associated with the process or the user who invoked the function call, and the operating system will record the file invariant. If the file invariant has been created, which means that the function is the second function of a paired function calls, the operating system will check the identity of the user or process invoking the function call, step 1212. If the user or process identity associated with the function call is the same as the user or process identity associated with the file invariant, step 1214, then the operating system checks whether a "tainted" flag is set, step 1236. The tainted flag may be set if the file invariant has been accessed by another process as explained below. If the tainted flag is set, an alert is set, step 1222, and the function will not be invoked. If the tainted flag is not set, then the operating system will check if the function call is part of a sequence of function calls, step 1224. A sequence of function calls involves multiple function calls that concern a single file invariant. For example, (open, chown, chmod) is a triple function calls used to change the ownership and mode of a file. First the file is open, then the ownership is changed, and finally the mode is changed. These three operations are done consecutively. The sequence of function calls is not limited to three consecutive function calls; it may involve an arbitrary number of functions. If the function call is not part of a sequence of function calls, then the file invariant is removed, step 1226, the associated timer is also stopped, step 1234, and the function call is invoked, step 1210. If the function call is part of a long sequence of function calls, such as (open, chown, chmod, truncate, execve), then the timer is reset, step 1228, the function call is invoked, step 1210, and the file invariant is not removed. If the user identity of the function is not the same as the user identity of the file invariant, the operating system checks if the user identity is root, step 1216. If the function call is invoked by root, the operating system changes the identity associated with the file invariant to root, step 1218, resets the timer, step 1220, and the function call is invoked, step 1210. If the user identity is not root, this means that either the computer system may be under attack or the timer may have expired and the file invariant not removed. The timer is then checked, step 1230. If the timer has expired, the operating system will allow the access of the file invariant, but the operating system will record the access by setting up a "tainted" flag, step 1232, to indicate the access of the file invariant by another user. If the timer has not expired, then operating system rejects the function call and an alert is set, step 1222. Because the function call is refused, the attack is prevented and the system is never endangered.

There is a possibility that a function call may be part of a long sequence of function calls and the file invariant may be needed to prevent the system vulnerability through all the function calls in this long sequence of function calls. One way to ensure that a file invariant is properly cleaned up and the system resource properly released is through use of the timer. The timer is started when a file invariant is created and the timer is removed or stopped when the file invariant is deleted or otherwise removed. The timer is reset each time an authorized function call that concerns the same file invariant is invoked, so the file invariant is properly protected. The file invariant can be disabled by a function call invoked by a different user after the timer has expired since the file invariant was last accessed. A file invariant may also be removed when the process to which it is associated is terminated. Table 9 above discloses many more rules on the maintenance of file invariants.

While the invention has been particularly shown and described with reference to a preferred embodiment thereof, it will be understood by those skilled in the art that various changes in form and detail may be made without departing from the spirit and scope of the present invention as set forth in the following claims. For example, the description above is for Unix-based operating system, it is understood the apparatus, system, and method can be easily modified to support other operating systems. Furthermore, although elements of the invention may be described or claimed in the singular, the plural is contemplated unless limitation to the singular is explicitly stated.

What is claimed is:

1. A method for reducing vulnerability in a computer system, the computer system having a generation unit, a timer and memory, by identifying vulnerable pairs of function calls, comprising the steps of:
generating, by the generation unit, a plurality of pairs of the function calls according to a predefined criteria;
invoking a first function call from a pair of the function calls by a first user;
creating a file invariant associated with the pair of the function calls, the file invariant having a tainted flag;
starting the timer;
associating the timer with the file invariant;
if a second function call is from the pair of the function calls and is invoked by a second user and the timer has not expired, denying the second function call to the second user;
if the second function call is from the pair of the function calls and is invoked by the second user and the timer has expired, setting the tainted flag for the file invariant and allowing the second function call by the second user;
if the second function call is from the pair of the function calls and is invoked by the first user and the tainted flag for the file invariant is set, denying the second function call to the first user; and
if the second function call is from the pair of the function calls and is invoked by the first user and the tainted flag for the file invariant is not set, allowing the second function call to the first user, removing the file invariant, and stopping the timer.

2. The method of claim 1, further comprising the step of indicating an alert if the tainted flag for the file invariant is set.

3. The method of claim 1 further comprising the step of setting a flag in the file invariant if the information from the second functional call is different from the file invariant.

4. The method of claim 1, wherein the step of generating a plurality of pairs further comprising the step of pairing a function call from a first predefined class with a function call from a second predefined class.

5. The method of claim 1, wherein the file invariant being a link between a file name and a file storage location.

6. The method of claim 1, wherein the file invariant being a file ownership information.

7. The method of claim 1, further comprising the step of classifying the function calls into to a plurality of predefined classes, wherein the plurality of predefined classes include creation, removal, check, and normal use.

8. The method of claim 1, wherein the plurality of pairs being a full list of potential combination of pairs of function calls that conform to the predefined criteria.

9. The method of claim 1, wherein the step of disabling the file invariant further comprising the step of setting the tainted flag.

10. The method of claim 1, further comprising the step of disabling the file invariant further comprising the step of setting the tainted flag.

11. The method of claim 1, further comprising the step of, if the second function call is part of a sequence of at least three function calls and is invoked by the first user and the tainted flag for the file invariant is not set, resetting the timer and allowing the second function call to the first user.

12. A system for reducing vulnerability in a computer system by identifying vulnerable pairs of function calls, comprising:
a classifying unit for classifying the function calls into a plurality of predefined classes; and
a generation unit for generating a plurality of pairs of the function calls according to a predefined criteria;
wherein
a file invariant is created by the computer system and associated with a pair of the function calls generated by the generation unit when a first function call from the pair of the function calls is invoked by a first user, the file invariant includes a tainted flag, the tainted flag is set when the pair of function calls being invoked by two different processes, the file invariant is associated with a timer and the timer is set when the first function call from the pair of the function calls is invoked by a first user,
if the timer is expired and a second function call in the pair of the function calls is invoked by a second user, allowing the second function call by the second user and setting the tainted flag, and
if the second function call in the pair of the function calls is invoked by the first user and the tainted flag is not set, allowing the second function call by the first user, removing the file invariant, and stopping the timer.

13. The system of claim 12, further comprising a file invariant creation unit for creating the file invariant.

14. The system of claim 13, further comprising a file invariant checking unit for checking information created when the second function call is invoked against the first file invariant.

15. The system of claim 12, wherein the generation unit further being capable of pairing a function call from a first predefined class with a function call from a second predefined class.

16. The system of claim 12, wherein the file invariant being a link between a file name and a file storage location.

17. The system of claim 12, wherein the file invariant being a file ownership information.

18. The system of claim 12, wherein the plurality of predefined classes include creation, removal, check, and normal use.

19. The system of claim 12, wherein, if the second function call is part of a sequence of at least three function calls and is invoked by the first user and the tainted flag for the file invariant is not set, resetting the timer and allowing the second function call to the first user.

20. A computer readable storage device having computer readable code, which when executed by a computer implements an operating system for a computer system with reduced vulnerability, the operating system comprising:
a library of plurality of function calls;
a classifying unit, the classifying unit classifies the function calls into a plurality of predefined classes; and
a generation unit, the generation unit generates a plurality of pairs of the function calls according to a predefined criteria,
wherein
each pair of the function calls being associated with a file invariant when a first function call from the pair of the function calls is invoked by a first user, the file invariant includes a tainted flag, the tainted flag is set when a pair of function calls being invoked by different processes, the file invariant is associated with a timer and the timer is set when the first function call from the pair of the function calls is invoked by the first user, if the timer is expired and a second function call in the pair of the function calls is invoked by a second user, allowing the second function call by the second user and setting the tainted flag, and if the second function call in the pair of the function calls is invoked by the first user and the tainted flag is not set, allowing the second function call by the first user, removing the file invariant, and stopping the timer.

21. The operating system of claim 20, further comprising a file invariant creation unit for creating a file invariant when the first function call within a pair of the function calls is invoked.

22. The operating system of claim 21, further comprising a file invariant checking unit for checking information created when the second function call is invoked against the first file invariant.

23. The operating system of claim 20, wherein the generation unit further being capable of pairing a function call from a first predefined class with a function call from a second predefined class.

24. The operating system of claim 20, wherein the file invariant being a link between a file name and a file storage location.

25. The operating system of claim 20, wherein the file invariant being a file ownership information.

26. The operating system of claim 20, wherein the plurality of predefined classes include creation, removal, check, and normal use.

27. The operating system of claim 20, wherein, if the second function call is part of a sequence of at least three function calls and is invoked by the first user and the tainted flag for the file invariant is not set, resetting the timer and allowing the second function call to the first user.

* * * * *

UNITED STATES PATENT AND TRADEMARK OFFICE
CERTIFICATE OF CORRECTION

| | | |
|---|---|---|
| PATENT NO. | : 8,127,413 B2 | Page 1 of 1 |
| APPLICATION NO. | : 11/484976 | |
| DATED | : March 6, 2012 | |
| INVENTOR(S) | : Calton Pu and Jinpeng Wei | |

It is certified that error appears in the above-identified patent and that said Letters Patent is hereby corrected as shown below:

Column 1, line 3, please insert the following into the specification before the Background of the Invention:

--GOVERNMENT FUNDING

This invention was made with Government support under Grant Numbers CCR-0219902 and CCR-0121643, awarded by the National Science Foundation. The Government has certain rights in the invention.--

Signed and Sealed this
First Day of May, 2012

David J. Kappos
*Director of the United States Patent and Trademark Office*